US012755691B2

(12) United States Patent
Kim et al.

(10) Patent No.: US 12,755,691 B2
(45) Date of Patent: Oct. 6, 2026

(54) DISPLAY DEVICE

(71) Applicant: SAMSUNG DISPLAY CO., LTD., Yongin-si (KR)

(72) Inventors: Hyeon Sik Kim, Yongin-si (KR); Gun Hee Kim, Seoul (KR); Tae Kyung Ahn, Seocheon-gun (KR); Dae Young Lee, Seoul (KR); Sang Woo Kim, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/146,228

(22) Filed: Dec. 23, 2022

(65) Prior Publication Data

US 2023/0317007 A1 Oct. 5, 2023

(30) Foreign Application Priority Data

Mar. 29, 2022 (KR) ........................ 10-2022-0038703

(51) Int. Cl.
*G09G 3/3233* (2016.01)
*G06V 40/13* (2022.01)

(52) U.S. Cl.
CPC ....... *G09G 3/3233* (2013.01); *G06V 40/1318* (2022.01); *G09G 2300/0426* (2013.01);
(Continued)

(58) Field of Classification Search
CPC .... G09G 3/30–3291; G09G 2300/0842–0871; G09G 2300/0819;
(Continued)

(56) References Cited

U.S. PATENT DOCUMENTS

| | | | | |
|---|---|---|---|---|
| 10,957,749 | B2 * | 3/2021 | Jung | H10K 59/65 |
| 11,056,049 | B2 * | 7/2021 | Kim | G09G 3/32 |

(Continued)

FOREIGN PATENT DOCUMENTS

| | | |
|---|---|---|
| KR | 1020190015688 | 2/2019 |
| KR | 1020200082663 | 7/2020 |

(Continued)

OTHER PUBLICATIONS

Office Action dated Feb. 5, 2026 issued in corresponding Korean Application No. KR 10-2022-0038703.

*Primary Examiner* — Patrick F Marinelli
(74) *Attorney, Agent, or Firm* — F. CHAU & ASSOCIATES, LLC

(57) ABSTRACT

A display device includes a pixel including a display driver configured to apply a driving current to a light-emitting element; and an optical sensor including a sensing driver configured to apply a sensing current to a read-out line based on a photocurrent from the photoelectric conversion element, wherein the pixel further includes, a driving transistor configured to control the driving current, a first transistor configured to apply a first initialization voltage to an anode of the light-emitting element based on an emission control signal, and a second transistor configured to connect the anode of the light-emitting element to a first electrode of the driving transistor in accordance with the emission control signal, and wherein a channel of the first transistor is a different material from channels of the driving transistor and the second transistor.

18 Claims, 16 Drawing Sheets

(52) U.S. Cl.
CPC ............... *G09G 2300/0452* (2013.01); *G09G 2300/0819* (2013.01); *G09G 2300/0842* (2013.01); *G09G 2300/0861* (2013.01); *G09G 2310/08* (2013.01); *G09G 2330/021* (2013.01); *G09G 2354/00* (2013.01); *G09G 2360/145* (2013.01)

(58) Field of Classification Search
CPC ... G09G 2360/14–148; G09G 2354/00; G06V 40/12–1394
See application file for complete search history.

(56) References Cited

U.S. PATENT DOCUMENTS 11,106,884 B2* 8/2021 Ding .................. G06V 40/1306
11,158,258 B2* 10/2021 Cha ...................... G09G 3/3233
11,176,883 B2* 11/2021 Na ......................... G09G 3/325
11,450,271 B2 9/2022 Na
11,520,440 B2* 12/2022 Kim ...................... G06F 3/0446
11,543,919 B2* 1/2023 Han ...................... G06F 3/0446
11,610,541 B1* 3/2023 Kim ......................... G09G 3/32
11,694,612 B2* 7/2023 Lee .......................... G09G 3/32 345/211
11,700,752 B2* 7/2023 Lee .................... G06V 40/1318 345/174
11,715,405 B1* 8/2023 Ratnasingam ......... G09G 3/002 345/204
11,727,874 B2* 8/2023 Cha ...................... G09G 3/3233 345/690
11,776,299 B2* 10/2023 Yao .................... G06V 40/1318 348/207.99
11,955,078 B2* 4/2024 Song .................... G09G 3/3233
12,211,422 B2* 1/2025 Lee ..................... G06F 3/04182
12,482,420 B2* 11/2025 Song .................... G09G 3/3233
12,484,389 B2* 11/2025 Cha ...................... G09G 3/3241
12,536,830 B2* 1/2026 Song .................. G06V 40/1318
12,586,523 B2* 3/2026 Kim ..................... G09G 3/3233
2009/0109142 A1* 4/2009 Takahara ............... G09G 3/006 345/76
2009/0201231 A1* 8/2009 Takahara ............. G09G 3/3233 345/76
2015/0263052 A1* 9/2015 Yamazaki ......... H10F 39/80377 257/43
2016/0233252 A1* 8/2016 Koyama ................ H10D 86/60
2019/0043420 A1* 2/2019 Jung .................. G06V 40/1318
2019/0355302 A1* 11/2019 Ding .................... G09G 3/3275
2020/0168147 A1* 5/2020 Na ......................... G09G 3/325
2020/0193118 A1* 6/2020 Ding .................. G06V 40/1306
2020/0273397 A1* 8/2020 Jeong ....................... G09G 3/32
2021/0027696 A1* 1/2021 Kim ..................... G09G 3/3233
2021/0065631 A1* 3/2021 Kim ....................... G11C 19/28
2021/0125557 A1* 4/2021 Na ....................... G09G 3/3233
2021/0158751 A1* 5/2021 Cha ...................... G09G 3/3233
2021/0365660 A1* 11/2021 Chen .................. G06V 40/1318
2022/0036826 A1* 2/2022 Cha ...................... G09G 3/3233
2022/0052101 A1* 2/2022 Yao .................... G06V 40/1318
2022/0067340 A1* 3/2022 Han ...................... G06F 3/0446
2022/0075979 A1* 3/2022 Han .................... G06V 40/1318
2022/0109042 A1* 4/2022 Kim .................... G06V 40/1318
2022/0285460 A1* 9/2022 Kim ..................... H10K 59/873
2022/0317852 A1* 10/2022 Park .................... G06F 3/04166
2022/0336561 A1* 10/2022 Cha ...................... G09G 3/3241
2023/0006020 A1* 1/2023 Lee .................... G06V 40/1318
2023/0049300 A1* 2/2023 Katsuta ................ G09G 3/3266
2023/0069681 A1* 3/2023 Jo ........................ G09G 3/3241
2023/0075463 A1* 3/2023 Lee .................... G06V 40/1318
2023/0089207 A1* 3/2023 Lee .......................... G09G 3/32 345/211
2023/0098891 A1* 3/2023 Song .................... G09G 3/3233 345/207
2023/0108746 A1* 4/2023 Jo ......................... H10F 39/802 345/206
2023/0108865 A1* 4/2023 Kim ......................... G09G 3/32 345/55
2023/0109051 A1* 4/2023 Jeon ....................... H10K 59/65 257/72
2023/0109356 A1* 4/2023 Bae ........................ H10K 71/00 257/40
2023/0116805 A1* 4/2023 Kim ..................... G09G 3/3233 345/76
2023/0120673 A1* 4/2023 Bok ......................... H04R 7/04 345/174
2023/0154401 A1* 5/2023 Li ........................ G09G 3/3266 345/204
2023/0154411 A1* 5/2023 Lee .................... G06V 40/1306 345/204
2023/0178017 A1* 6/2023 Wang ................... H10D 86/441 345/55
2023/0186672 A1* 6/2023 Lee ...................... G06V 10/143 345/156
2023/0196984 A1* 6/2023 Noh ......................... G09G 3/32 345/55
2023/0206847 A1* 6/2023 Na ....................... G09G 3/3233 345/214
2023/0213427 A1* 7/2023 Seo ........................ G01N 15/06 345/207
2023/0215365 A1* 7/2023 Lee .................... G06V 40/1318 345/204
2023/0215371 A1* 7/2023 Na ......................... G09G 3/325 345/204
2023/0225160 A1* 7/2023 Cho ..................... H10D 86/441 345/694
2023/0245619 A1* 8/2023 Yoon .................... G09G 3/3233 345/691
2023/0317007 A1* 10/2023 Kim ...................... G06F 3/0412 345/76
2024/0257698 A1* 8/2024 Lee ..................... G06F 3/04164

FOREIGN PATENT DOCUMENTS

KR 1020210040202 4/2021
KR 10-2021-0049221 A 5/2021
WO 2020165686 8/2020

* cited by examiner

DISPLAY DEVICE

CROSS-REFERENCE TO RELATED APPLICATION

This U.S. non-provisional patent application claims priority 35 U.S.C. § 119 to Korean Patent Application No. 10-2022-0038703 filed on Mar. 29, 2022 in the Korean Intellectual Property Office, the disclosure of which is incorporated by reference in its entirety herein.

1. TECHNICAL FIELD

The present disclosure relates to a display device.

2. DISCUSSION OF THE RELATED ART

Display devices have been applied to various electronic devices such as a smart phone, a digital camera, a notebook computer, a navigation system, a smart watch, and a smart television. Examples of display devices include flat panel display devices such as a liquid crystal display (LCD) device, a field emission display (FED) device, or an organic light-emitting diode (OLED) display device.

Sensors for touch recognition and fingerprint recognition may be incorporated into a display panel of a flat panel display device. For example, the sensor may include one or more photoelectric conversion elements for sensing light and converting the sensed light into an electrical signal. However, a leakage current in each photoelectric conversion element may result in the deterioration of the performance of the photoelectric conversion element PD.

SUMMARY

At least one embodiment of the present disclosure provides a display device capable of reducing a leakage current in each photoelectric conversion element while increasing a photocurrent in each photoelectric conversion element.

According to an embodiment of the present disclosure, a display device includes a pixel including a display driver configured to apply a driving current to a light-emitting element; and an optical sensor including a sensing driver configured to apply a sensing current to a read-out line based on a photocurrent from the photoelectric conversion element. The pixel further includes, a driving transistor configured to control the driving current, a first transistor configured to apply a first initialization voltage to an anode of the light-emitting element based on an emission control signal from an emission control line, and a second transistor configured to connect the anode of the light-emitting element to a first electrode of the driving transistor based on the emission control signal. A channel of the first transistor is a different material from channels of the driving transistor and the second transistor.

The channels of the driving transistor and the second transistor include polysilicon, and the channel of the first transistor includes an oxide semiconductor.

The driving transistor and the second transistor may include P-type metal-oxide semiconductor field-effect transistors (MOSFETs), and the first transistor may include an N-type MOSFET.

The channel of the first transistor may overlap with an emission control line providing the emission control signal in a plan view or a thickness direction.

The optical sensor may further include a first sensing transistor configured to control a sensing current flowing into the read-out line based on a voltage of a sensing anode of the photoelectric conversion element, and a reset transistor configured to initialize the sensing anode of the photoelectric conversion element to a first-level voltage.

The first transistor may be turned on when the emission control signal is a second-level voltage higher than the first-level voltage and is applied to the first transistor.

The display device may further include first-level voltage lines transmitting the first-level voltage, wherein some of the first-level voltage lines are connected to a scan driver configured to provide scan signals, and others of the first-level voltage lines are connected to one of first and second electrodes of the reset transistor.

The light-emitting element may include an anode, a cathode, and a light-emitting layer disposed between the anode and the cathode, the photoelectric conversion element may include a sensing anode, a sensing cathode, and a photoelectric conversion layer disposed between the sensing anode and the sensing cathode, and the cathode and the sensing cathode may be connected to a common voltage line configured to apply a common voltage.

The first-level voltage may be lower than the common voltage.

According to an embodiment of the present disclosure, a display device includes a pixel including a display driver configured to apply a driving current to a light-emitting element; and an optical sensor including a sensing driver configured to apply a sensing current to a read-out line in accordance with a photocurrent from a photoelectric conversion element. The pixel further includes a driving transistor configured to control the driving current, and a first transistor configured to apply a first initialization voltage to an anode of the light-emitting element based on an emission control signal. The optical sensor further includes a first sensing transistor configured to control a sensing current flowing into the read-out line, based on a voltage of a sensing anode of the photoelectric conversion element, and a reset transistor configured to initialize the sensing anode of the photoelectric conversion element to a first-level voltage.

The light-emitting element may be initialized when the emission control signal has a pulse rising from the first-level voltage to the second-level voltage higher than the first-level voltage, and emits light when the emission control signal has a pulse falling from the second-level voltage to the first-level voltage.

The display device may further include a common voltage line configured to apply a common voltage to a sensing cathode of the photoelectric conversion element, wherein the first-level voltage is lower than the common voltage.

A cathode of the light-emitting element may be electrically connected to the sensing cathode of the photoelectric conversion element.

The pixel may further include a second transistor configured to connect the anode of the light-emitting element to a first electrode of the driving transistor based on the emission control signal from the emission control line, and the second transistor may be turned on when the emission control signal having the first-level voltage is applied to the second transistor.

The photoelectric conversion element may be in a reverse-biased state during a period when the reset transistor is turned on.

An operating point of the photoelectric conversion element may be lower than a reference voltage during the period when the reset transistor is turned on.

The optical sensor may further include a first node, which is disposed between the sensing anode of the photoelectric conversion element and the first sensing transistor, and a voltage of the first node increases during a period when the photoelectric conversion element is exposed to light.

The photoelectric conversion element may generate a photocurrent flowing from the sensing cathode to the sensing anode, during the period when the photoelectric conversion element is exposed to light.

The pixel further include a second transistor configured to be turned on in accordance with a scan signal from a scan line, and the optical sensor may further include a second sensing transistor configured to connect the first sensing transistor and the read-out line in accordance with the scan signal from the scan line.

A channel of the first transistor may be a different material from channels of the driving transistor and the first sensing transistor.

According to at least one embodiment of the present disclosure, a leakage current of a photoelectric conversion element can be reduced, or the amount of photocurrent generated upon exposure to external light can be increased by changing the voltage applied to the photoelectric conversion element.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
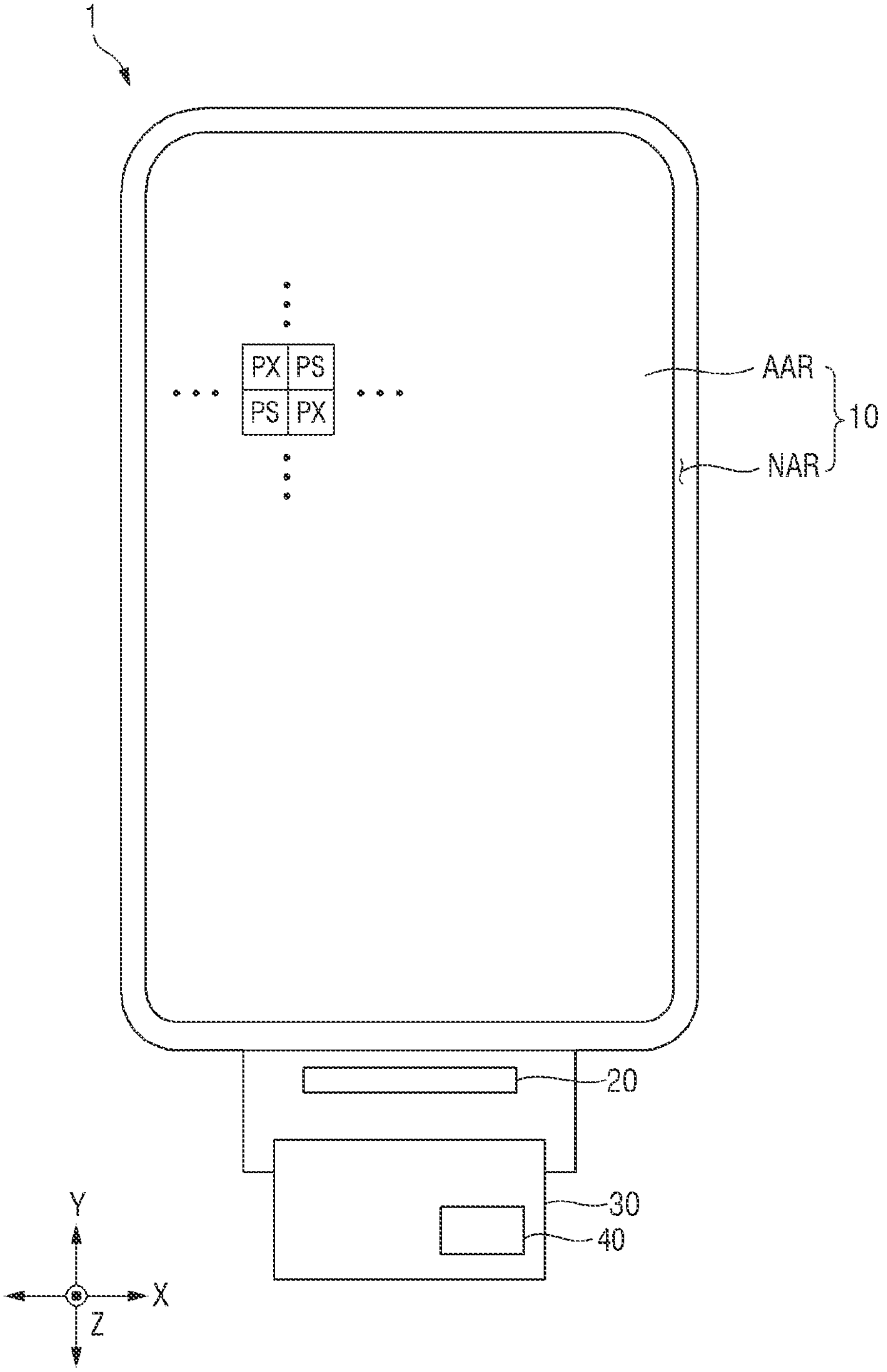
FIG. 1 is a plan view of a display device according to an embodiment of the present disclosure.

Embodiments of the invention will now be described more fully hereinafter with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. Additionally, it is to be understood that in the drawings, the relative thicknesses, proportions, angles, and dimensions of components are intended to be drawn to scale for at least one embodiment of the present disclosure, however, changes may be made to these characteristics within the scope of the present disclosure and the present inventive concept is not necessarily limited to the properties.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will also be understood that when a layer is referred to as being "on" another layer or substrate, it can be directly on the other layer or substrate, or intervening layers may also be present. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Embodiments described herein should not be construed as limited to the particular shapes of regions as illustrated herein but are to include deviations in shapes that result, for example, from manufacturing. A region illustrated or described as flat may have rough and/or nonlinear features in alternate embodiments. Moreover, sharp angles that are illustrated may be rounded in alternate embodiments. Thus, the regions illustrated in the drawing figures are schematic in nature and their shapes are not intended to limit the scope of the claims.

Hereinafter, example embodiments of the invention will be described in detail with reference to the accompanying drawings FIG. 1 is a plan view of a display device according to an embodiment of the present disclosure.

First, second, and third directions X, Y, and Z are as shown in FIG. 1. Referring to FIG. 1, the first direction X may be a direction parallel to one side of a display device 1 in a plan view, and may be, for example, a horizontal direction of the display device 1. The second direction Y may be a direction parallel to another side of the display device that meets a side of the display device 1 that corresponds to the first direction X, in a plan view and may be, for example, a vertical direction of the display device 1. For convenience, in a plan view, first sides and second sides in the first direction X may refer to leftward and rightward directions, respectively, and first and second sides in the second direction Y may refer to upward and downward directions, respectively. The third direction Z may refer to the thickness direction of the display device 1. The first, second, and third directions X, Y, and Z, however, are not particularly limited, but are exemplary.

Unless specified otherwise, the terms "on," "above," "upper," "top surface," and the like, may refer to the display surface of a display panel 10, and the terms "below," "lower," "bottom surface," and the like may refer to the opposite surface to the display surface of the display panel 10.

Referring to FIG. 1, the display device 1 may be an electronic device including a display screen. Examples of the display device 1 include, but are not limited to, a mobile phone, a smart phone, a tablet personal computer (PC), a mobile communication terminal, an electronic notepad, an electronic book, a personal digital assistant (PDA), a portable multimedia player (PMP), a navigation device, a ultramobile PC (UMPC), a television (TV), a game console, a wristwatch-type electronic device, a head mounted display (HMD), a PC monitor, a notebook computer, a car dashboard, a digital camera, a camcorder, an external advertisement board, an electric billboard, various medical equipment, various inspection devices, various home appliances having a display area (e.g., a refrigerator or a washing machine), an Internet of Things (IoT) device, and the like. Specifically, the display device 1 may be, for example, a smartphone, a tablet PC, or a notebook computer, but the present disclosure is not limited thereto.

The display device 1 may include the display panel 10, a panel driving circuit 20, a circuit board 30, and a read-out circuit 40.

The display device 1 may include the display panel 10, which includes an active region AAR and a nonactive region NAR. The active region AAR may include a display area DA, which displays an image. The active region AAR may completely overlap with the display area DA. A plurality of pixels PX, which display an image, may be disposed in the display area DA. Each of the pixels PX may include a light-emitting element EL of FIG. 4.

The active region AAR may further include a fingerprint sensing area. The fingerprint sensing area is an area that reacts to light. The fingerprint sensing area may be an area configured to sense the amount and the wavelength of light incident thereupon. The fingerprint sensing area may overlap with the display area DA. The fingerprint sensing area may completely coincide with the display area DA, in a plan view, in which case, the entire display area DA may be an area for sensing a fingerprint. Alternatively, the fingerprint sensing area may be provided only in a limited area for fingerprint recognition, in which case, the fingerprint sensing area may overlap with only part of the display area DA.

The fingerprint sensing area of the active region AAR may further include a plurality of optical sensors, which react to light. Each of the optical sensors PS may include a photoelectric conversion element PD of FIG. 4, which senses light incident thereupon and converts the incident light into an electrical signal.

The nonactive region NAR may be disposed around the active region AAR. The nonactive region NAR may be a bezel region. The nonactive region NAR may surround all the four sides of the active region AAR, but the present disclosure is not limited thereto.

The panel driving circuit 20 may be disposed in the nonactive region NAR. The panel driving circuit 20 may drive the pixels PX and/or the optical sensors PS. The panel driving circuit 20 may output signals and voltages for driving the display panel 10. The panel driving circuit 20 may be formed as an integrated circuit (IC) and may be mounted on the display panel 10. Signal lines for transmitting signals between the panel driving circuit 20 and the active region AAR may be further disposed in the nonactive region NAR. Alternatively, the panel driving circuit 20 may be mounted on the circuit board 30.

The read-out circuit 40 or signal lines for applying signals to the active region AAR may also be disposed in the nonactive region NAR. The read-out circuit 40 may be connected to the optical sensors PS through signal lines and may receive currents from the optical sensors PS to detect a fingerprint input from a user. The read-out circuit 40 may be formed as an IC and may be attached on a display circuit board in a chip-on-film (COF) manner, but the present disclosure is not limited thereto. Alternatively, the read-out circuit 40 may be attached to the nonactive region NAR of the display panel 10 in a chip-on-glass (COG) or chip-on-plastic (COP) manner or through ultrasonic bonding.

The circuit board 30 may be attached to one end of the display panel 10 via an anisotropic conductive film (ACF). Lead lines of the circuit board 30 may be electrically connected to a pad unit of the display panel 10. The circuit board 30 may be a flexible printed circuit board (FPCB) or a flexible film such as a COF.

Figure 2:
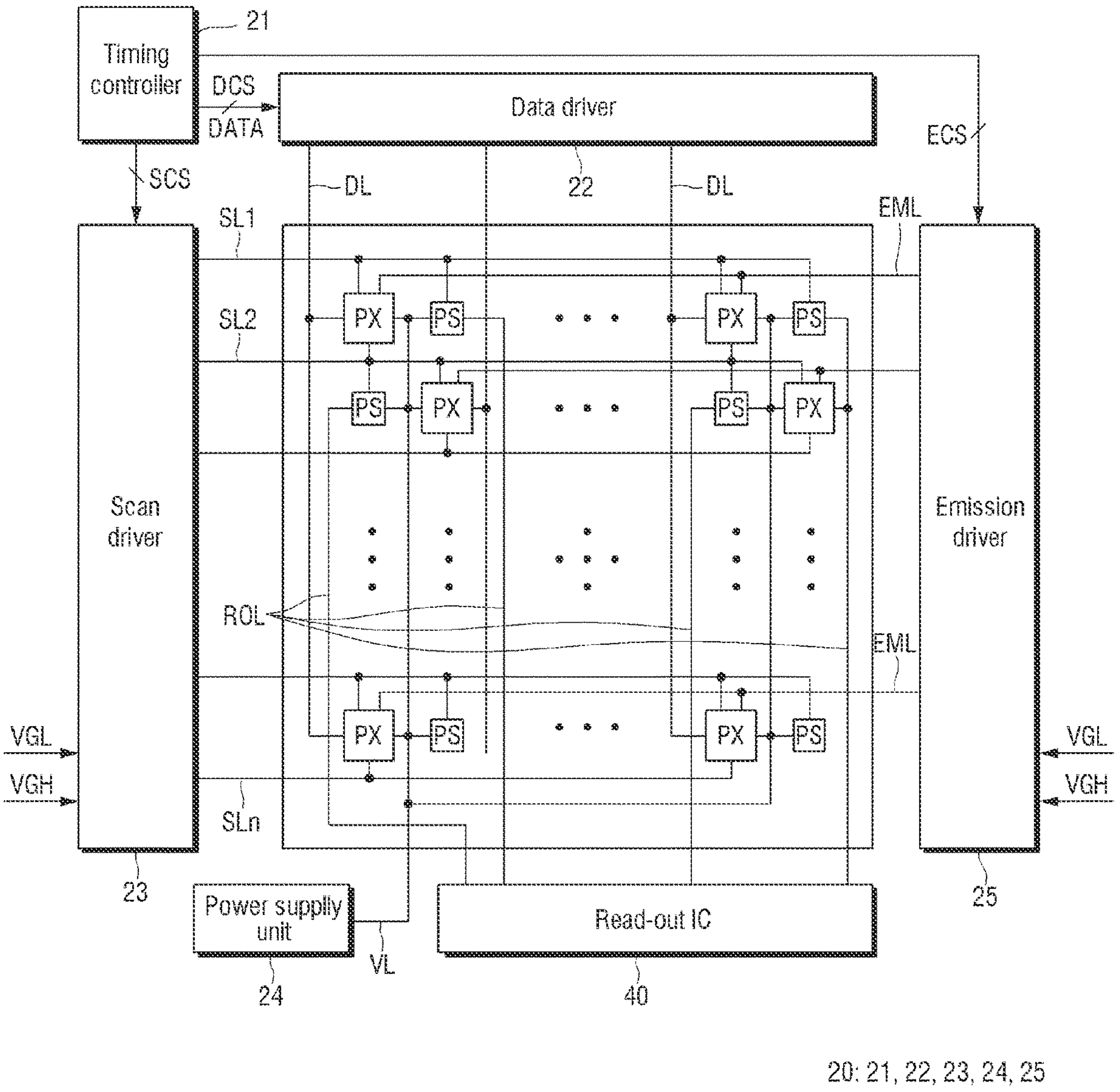
FIG. 2 is a block diagram of the display device of FIG. 1.

FIG. 2 is a block diagram of the display device of FIG. 1.

Referring to FIG. 2, the pixels PX and the optical sensors PS, which are disposed in the active region AAR of the display panel 10, may be driven by the panel driving circuit 20.

The panel driving circuit 20 may include a data driver 22 (e.g., a driver circuit), which drives the pixels PX of the display panel 10, a scan driver 23 (e.g., a driver circuit), which drives the pixels PX and the optical sensors PS, and a timing controller 21 (e.g., a control circuit), which controls the timing of the driving of the data driver 22 and the scan driver 23. The panel driving circuit may further include a power supply unit 24 (e.g., a power supply) and an emission control driver 25 (e.g., a driver circuit).

The timing controller 21 receives an image signal from outside the display device 1. The timing controller 21 may output image data DATA and a data control signal DCS to the data driver 22. The timing controller 21 may generate a scan control signal SCS for controlling the timing of the driving of the scan driver 23 and an emission control driving signal ECS for controlling the timing of the driving of the emission control driver 25. For example, the timing controller 21 may generate the scan control signal SCS and the emission control driving signal ECS and may output the scan control signal SCS to the scan driver 23 through a scan control line and the emission control driving signal ECS to the emission control driver 25 through an emission control driving line.

The data driver 22 may convert the image data DATA into analog data voltages and may output the data voltages to data lines DL. The scan driver 23 may generate scan signals in response to the scan control signal SCS and may sequentially output the scan signals to first through n-th scan lines SL1 through SLn. Each of the scan signals may have a pulse with a first-level voltage VGL from a first-level voltage line or with a second-level voltage VGH from a second-level voltage line. In an embodiment, the first-level voltage VGL is less than the second-level voltage VGH. For example, each of the scan signals may have a pulse rising from the first-level voltage VGL to the second-level voltage VGH or falling from the second-level voltage VGH to the first-level voltage VGL.

Figure 4:
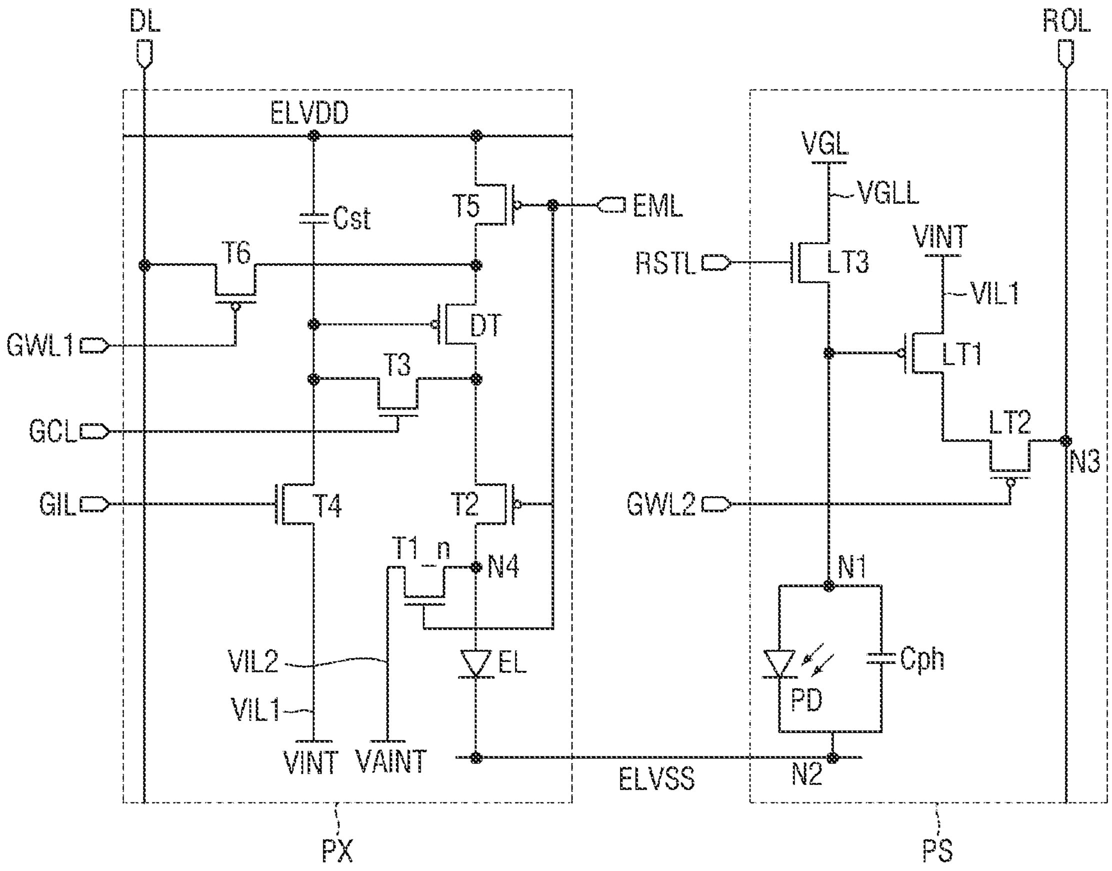
FIG. 4 is a circuit diagram illustrating a pixel and an optical sensor of the display device of FIG. 1.

The power supply unit 24 may generate a driving voltage ELVDD of FIG. 4 and a common voltage ELVSS of FIG. 4 and provide the driving voltage ELVDD and the common voltage ELVSS to power supply voltage lines VL. The power supply voltage lines VL may include a driving voltage line and a common voltage line. The driving voltage ELVDD may be a high-potential voltage for driving light-emitting elements EL and photoelectric conversion elements PD, and the common voltage ELVSS may be a low-potential voltage for driving the light-emitting elements EL and the photoelectric conversion elements PD. That is, the driving voltage ELVDD may have a higher potential than the common voltage ELVSS.

The emission control driver 25 may generate emission control signals in accordance with the emission control driving signals ECS and may sequentially output the emission control signals EM to emission control lines EML. Each of the emission control signals EM of the emission control driver 25 may have a pulse rising from the first-level voltage VGL to the second-level voltage VGH or falling from the second-level voltage VGH to the first-level voltage VGL. The emission control driver 25 is illustrated as being separate from the scan driver 23, but the present disclosure is not limited thereto. The emission control driver 25 may be included in the scan driver 23.

The read-out circuit 40 may be connected to the optical sensors PS through read-out lines ROL. The read-out circuit 40 may receive a current flowing in each of the optical sensors PS and sense a fingerprint input of the user using the received current. The read-out circuit 40 may be formed as an IC and may be attached to a display circuit board in a COF manner, but the present disclosure is not limited thereto. Alternatively, the read-out circuit 40 may be attached to the nonactive region NAR of the display panel 10 in a COG or COP manner or through ultrasonic bonding.

The read-out circuit 40 may generate fingerprint sensing data based on the magnitude of a current sensed from each of the optical sensors PS and may transmit the fingerprint sensing data to a processor, and the processor may determine whether the fingerprint of the user matches a predefined fingerprint by analyzing the fingerprint sensing data. If the fingerprint of the user matches the predefined fingerprint, a predefined function may be performed.

The display panel 10 may include the pixels PX, the optical sensors PS, the first through n-th scan lines SL1 through SLn, which are connected to the pixels PX and the optical sensors PS, and the data lines DL and the emission control lines EML, which are connected to the pixels PX, and may further include the read-out lines ROL, which are connected to the optical sensors PS.

Each of the pixels PX may be connected to one of the first through n-th scan lines SL1 through SLn, one of the data lines DL, at least one of the emission control lines EML, and the power supply voltage lines VL.

Each of the optical sensors PS may be connected to one of the first through n-th scan lines SL1 through SLn, one of the read-out lines ROL, and the power supply voltage lines VL.

The first through n-th scan lines SL1 through SLn may connect the scan driver 23 to the pixels PX and the optical sensors PS. The first through n-th scan lines SL1 through SLn may provide the scan signals from the scan driver 23 to the pixels PX and the optical sensors PS.

The data lines DL may connect the data driver 22 to the pixels PX. The data lines DL may provide image data from the data driver 22 to the pixels PX.

The emission control lines EML may connect the emission control driver 25 to the pixels PX. The emission control lines EML may provide the emission control signals EM from the emission control driver 25 to the pixels PX.

The read-out lines ROL may connect the read-out circuit 40 to the optical sensors PS. The read-out lines ROL may provide a sensing current generated based on a photocurrent from each of the optical sensors PS, to the read-out circuit 40. As a result, the read-out circuit 40 can sense the fingerprint of the user.

The power supply voltage lines VL may connect the power supply unit 24 to the pixels PX and the optical sensors PS. The power supply voltage lines VL may provide the driving voltage ELVDD or the common voltage ELVSS from the power supply unit 24 to the pixels PX and the optical sensors PS.

Figure 3:
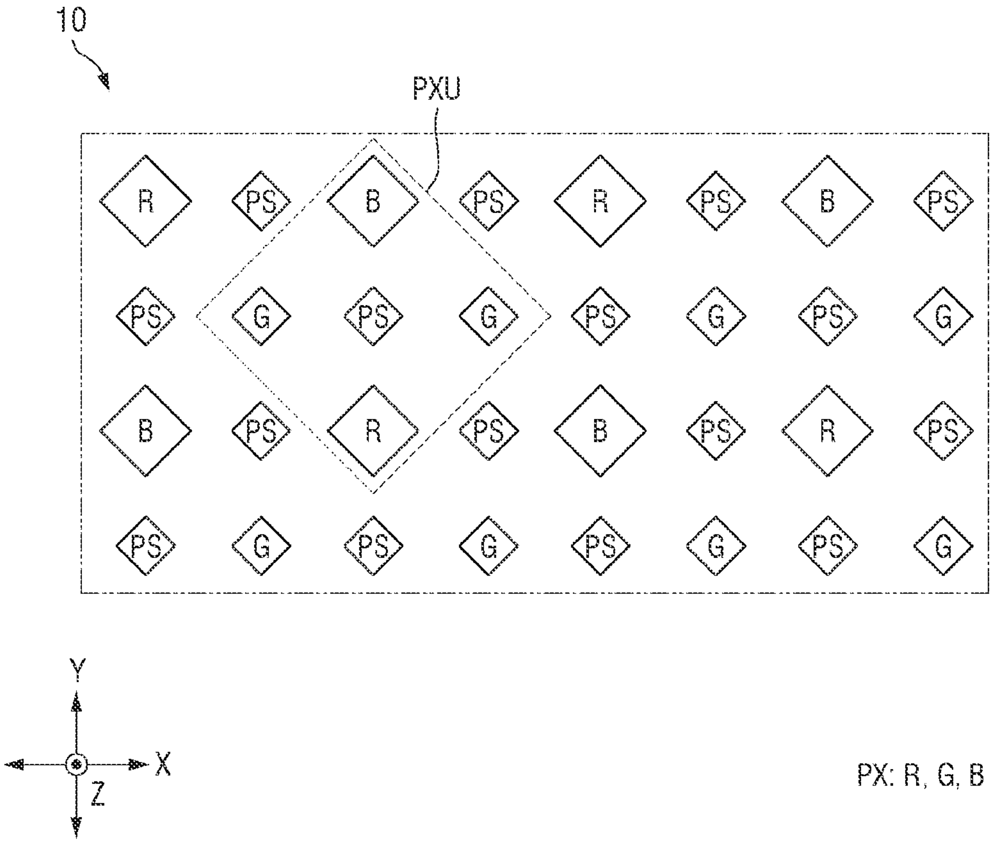
FIG. 3 is a layout view illustrating pixels and optical sensors of a display panel of FIG. 1.

FIG. 3 is a layout view illustrating the pixels and the optical sensors of the display panel of FIG. 1.

Referring to FIG. 3, the pixels PX may include first-color pixels R, second-color pixels G, and third-color pixels B. For example, the first-color pixels R, the second-color pixels G, and the third-color pixels B may be red pixels, green pixels, and blue pixels, respectively. Each of the pixels PX may include an emission area, which emits light. Each of the optical sensors PS may include an optical sensing area, which senses light incident thereupon.

The first-color pixels R, the second-color pixels G, the third-color pixels B, and the optical sensors PS may be alternately arranged in the first and second directions X and Y.

For example, the first-color pixels R and the third-color pixels B may be alternately arranged in a first row in the first direction X, and the second-color pixels G may be arranged in a second row adjacent to the first row. The pixels PX included in the first row may be arranged in a staggered manner with the pixels PX included in the second row. The number of second pixels G included in the second row may be twice the number of first- or third-color pixels R or B included in the first row. This pattern of arrangement of the pixels PX may be continued from the first row to an n-th row.

The optical sensors PS may be disposed in the first row to be spaced apart from the first-color pixels R and the third-color pixels B. In the first row, the first-color pixels R, the optical sensors PS, and the third-color pixels B may be alternately arranged along the first direction X. The optical sensors PS may be disposed in the second row between the second-color pixels G, and in the second row, the optical sensors PS and the second-color pixels G may be alternately arranged. The number of optical sensors PS included in the first row may be the same as the number of optical sensors PS included in the second row. This pattern of arrangement of the optical sensors PS may be continued from the first row to the n-th row.

Alternatively, the second-color pixels G and the optical sensors PS may be alternately arranged in the second row, and the optical sensors PS may not be disposed in the first row. In this case, the number of optical sensors PS included in the second row may be twice the number of first- or third-color pixels R or B included in the first row.

The emission areas of the pixels PX may have different sizes. The size of the emission areas of the second-color pixels G may be less than the size of the emission areas of the first- or third-color pixels R or B. The pixels PX are illustrated as having a rhombus shape, but the present disclosure is not limited thereto. Alternatively, the pixels PX may have a circular shape, a rectangular shape, an octagonal shape, or another polygonal shape.

Each pixel unit PXU may include one first-color pixel R, two second-color pixels G, and one third-color pixel B. Each pixel unit PXU may refer to a group of pixels PX that can represent gradation.

FIG. 4 is a circuit diagram illustrating a pixel and an optical sensor of the display device of FIG. 1 according to an example embodiment.

Referring to FIG. 4, a pixel PX may include a light-emitting element EL and a display driver, which controls the amount of light emitted by the light-emitting element EL. The display driver may include one or more thin-film transistors (TFTs) and various signal lines to apply a driving current to the light-emitting element EL.

The pixel PX may further include a driving transistor DT, the light-emitting element EL, switching elements, and a first capacitor Cst. The switching elements may include first, second, third, fourth, fifth, and sixth transistors T1_*n*, T2, T3, T4, T5, and T6.

The pixel PX may be connected to a scan initialization line GIL, a scan control line GCL, a first scan write line GWL1, an emission control line EML, and a data line DL. The pixel PX may also be connected to a driving voltage line, to which the driving voltage ELVDD is applied, a common voltage line, to which the common voltage ELVSS is applied, a first initialization voltage line VIL1, to which a first initialization voltage VINT is applied, and a second initialization voltage line VIL2, to which a second initialization voltage VAINT is applied.

The driving transistor DT may control a source-drain current or a driving current Isd in accordance with a data voltage applied to a gate electrode of the driving transistor DT. The driving current Isd, which flows through a channel of the driving transistor DT, may be proportional to the square of the difference between a threshold voltage Vth and a source-gate voltage Vsg, which is the voltage between a source electrode and the gate electrode of the driving transistor DT, as indicated by Equation (1):

$$Isd=k'\times(Vsg-|Vth|)^2 \quad (1)$$

where k' is a proportionality coefficient determined by the structure and physical characteristics of the driving transistor DT, Vsg is the source-gate voltage of driving transistor DT, and Vth is the threshold voltage of the driving transistor DT.

The driving transistor DT may control the driving current Isd, which is to be provided to the light-emitting element EL. The gate electrode of the driving transistor DT may be connected to first electrodes of the third transistor T3 and the first capacitor Cst, and a first electrode of the driving transistor DT may be connected to second electrodes of the second and sixth transistors T2 and DT6, and a second electrode of the driving transistor DT may be connected to a second electrode of the third transistor T3 and a first electrode of the second transistor T2. The driving transistor DT may have the characteristics of a p-type transistor and may include a polycrystalline semiconductor.

The light-emitting element EL emits light in accordance with the driving current Isd. The amount of light emitted by the light-emitting element EL may be proportional to the driving current Isd.

The light-emitting element EL may be an organic LED (OLED) including an anode, a cathode, and an organic emission layer, which is disposed between the anode and the cathode. Alternatively, the light-emitting element EL may be an inorganic LED including an anode, a cathode, and an inorganic semiconductor, which is disposed between the anode and the cathode. Still alternatively, the light-emitting element EL may be a quantum-dot LED including an anode, a cathode, and a quantum-dot emission layer, which is disposed between the anode and the cathode. Alternatively, the light-emitting element EL may be a microLED. The anode of the light-emitting element EL may correspond to a pixel electrode 170 of FIG. 5, and the cathode of the light-emitting element EL may correspond to a common electrode 190 of FIG. 5.

The anode of the light-emitting element EL may be connected to the second electrode of the second transistor T2 and a second electrode of the first transistor T1_*n*, and the cathode of the light-emitting element EL may be connected to the common voltage line.

The first transistor T1_*n* may be turned on by an emission control signal EM from the emission control line EML to connect the second initialization voltage line VIL2 and the anode of the light-emitting element EL. In this case, the anode of the light-emitting element EL may be discharged to a voltage as low as the second initialization voltage VAINT. A gate electrode of the first transistor T1_*n* may be connected to the emission control line EML, a first electrode of the first transistor T1_*n* may be connected to the second initialization voltage line VIL2, and a second electrode of the first transistor T1_*n* may be connected to the anode of the light-emitting element EL and a fourth node N4.

The second transistor T2 may be turned on by the emission control signal EM from the emission control line EML to connect the second electrode of the driving transistor DT and the anode of the light-emitting element EL. A gate electrode of the second transistor T2 may be connected to the emission control line EML, a first electrode of the second transistor T2 may be connected to the second electrode of the driving transistor DT, and the second electrode of the second transistor T2 may be connected to the anode of the light-emitting element EL.

The fifth transistor T5 may be turned on by the emission control signal EM from the emission control line EML to connect the first electrode of the driving transistor DT and the driving voltage line. A gate electrode of the fifth transistor T5 may be connected to the emission control line EML, a first electrode of the fifth transistor T5 may be connected to the driving voltage line, to which the driving voltage ELVDD is applied, and a second electrode of the fifth transistor T5 may be connected to the first electrode of the driving transistor DT.

When the second and fifth transistors T2 and T5 are both turned on, the driving current Isd may be provided to the light-emitting element EL.

In an embodiment, the first transistor T1_*n* receives the same emission control signal EM as the second and fifth transistors T2 and T5. However, when the first transistor T1_n is an N-type metal-oxide semiconductor (NMOS) transistor and the second and fifth transistors T2 and T5 are P-type metal-oxide semiconductor (PMOS) transistors, the first transistor T1_n may be turned on at a different time from the second and fifth transistors T2 and T5. That is, an initialization operation by the first transistor T1_n may be performed not during an emission period when the second and fifth transistors T2 and T5 are turned on, but during a non-emission period when the second and fifth transistors T2 and T5 are turned off.

The third transistor T3 may be turned on by a scan control signal from the scan control line GCL to connect the gate electrode and the second electrode of the driving transistor DT. That is, when the third transistor T3 is turned on, the gate electrode and the second electrode of the driving transistor DT are connected together, and thus, the driving transistor DT may function as a diode. The gate electrode of the third transistor T3 may be connected to the scan control line GCL, the first electrode of the third transistor T3 may be connected to the second electrode of the driving transistor DT, and the second electrode of the third transistor T3 may be connected to the gate electrode of the driving transistor DT.

The fourth transistor T4 may be turned on by a scan initialization signal from the scan initialization line GIL to connect the gate electrode of the driving transistor DT and the first initialization voltage line VIL1. In this case, the gate electrode of the driving transistor DT may be discharged to a voltage as low as the first initialization voltage VINT from the first initialization voltage line VIL1. A gate electrode of the fourth transistor T4 may be connected to the scan initialization line GIL, a first electrode of the fourth transistor T4 may be connected to the first initialization voltage line VIL1, and a second electrode of the fourth transistor T4 may be connected to the gate electrode of the driving transistor DT.

The sixth transistor T6 may be turned on by a first scan write signal from the first scan write line GWL1 to connect the first electrode of the driving transistor DT and the data line DL. A gate electrode of the sixth transistor T6 may be connected to the first scan write line GWL1, a first electrode of the sixth transistor T6 may be connected to the data line DL, and the second electrode of the sixth transistor T6 may be connected to the first electrode of the driving transistor DT.

The first capacitor Cst may be formed between the gate electrode of the driving transistor DT and the driving voltage line. The first electrode of the first capacitor Cst may be connected to the gate electrode of the driving transistor DT, and a second electrode of the first capacitor Cst may be connected to the driving voltage line. As a result, the first capacitor Cst may be able to maintain the difference in electric potential between the voltage of the gate electrode of the driving transistor DT and the driving voltage ELVDD.

The driving transistor DT and the second, fifth, and sixth transistors T2, T5, and T6 may be, but are not limited to, P-type metal-oxide semiconductor field-effect transistors (MOSFETs) having their channels formed of a polycrystalline semiconductor such as, for example, polycrystalline silicon or amorphous silicon. The first, third, and fourth transistors T1_n, T3, and T4 may be, but are not limited to, N-type MOSFETs having their channels formed of an oxide semiconductor. For example, at least one of the second, fifth, and sixth transistors T2, T5, and T6 may include an oxide semiconductor.

When the driving transistor DT and the second, fifth, and sixth transistors T2, T5, and T6 are P-type MOSFETs, the driving transistor DT and the second, fifth, and sixth transistors T2, T5, and T6 may output a current input to their first electrodes to their second electrodes in response to a gate-low voltage. When the first, third, and fourth transistors T1_n, T3, and T4 are N-type MOSFETs, the first, third, and fourth transistors T1_n, T3, and T4 may output a current input to their first electrodes to their second electrodes in response to a gate-high voltage. For example, the gate-high voltage is higher than the gate-low voltage.

The first electrodes of the driving transistor DT and the second, fifth, and sixth transistors T2, T5, and T6 may be, but are not limited to, source electrodes, and the second electrodes of the driving transistor DT and the second, fifth, and sixth transistors T2, T5, and T6 may be, but are not limited to, drain electrodes. The first electrodes of the first, third, and fourth transistors T1_n, T3, and T4 may be, but are not limited to, source electrodes, and the second electrodes of the first, third, and fourth transistors T1_n, T3, and T4 may be, but are not limited to, drain electrodes.

An optical sensor PS may include a plurality of sensing transistors, a photoelectric conversion element PD, and a sensing capacitor Cph. The sensing transistors may include first, second, and third sensing transistors LT1, LT2, and LT3.

The optical sensor PS may be connected to a second scan write line GWL2, a reset line RSTL, and a read-out line ROL. The optical sensor may also be connected to the common voltage line, to which the common voltage ELVSS is applied, a first-level voltage line VGLL, to which the first-level voltage VGL is applied, and the first initialization voltage line VIL1, to which the first initialization voltage VINT is applied.

Signal lines and voltage lines for driving the optical sensor PS may be shared with signal lines and voltage lines for driving the pixel PX. That is, the manufacturing cost and the bezel area of the display panel 10 can be minimized by minimizing the addition of signal lines and voltage lines for driving the optical sensor PS to the display panel 10.

For example, the pixel PX and the optical sensor PS may be driven by the same scan signal. That is, in a case where the first scan write line GWL1, which is connected to the gate electrode of the sixth transistor T6 of the pixel PX, is an n-th scan line (where n is a positive integer), the second scan write line GWL2, which is connected to the second sensing transistor LT2 of the optical sensor PS, may be an (n+1)-th scan line. The cathode of the light-emitting element EL and a sensing cathode of the photoelectric conversion element PD may be electrically connected to the common voltage line, which applies the common voltage ELVSS, and may be integrally formed by sharing the common electrode 190.

In another example, the first-level voltage VGL may be provided to the scan driver 23 and the emission control driver 25 to generate a scan signal and an emission control signal EM and, at the same time, may be used as a reset voltage to reset the sensing anode of the photoelectric conversion element PD. That is, some first-level voltage lines VGLL, to which the first-level voltage VGL is provided, may be disposed in the nonactive region NAR to be connected to the scan driver 23 and the emission control driver 25, and some first-level voltage lines VGLL may be disposed in the active region AAR to be connected to first electrodes of the third sensing transistors LT3 of the optical sensors PS. However, the present disclosure is not limited to this, and other embodiments of the present disclosure will be described later with reference to FIG. 15.

Referring to FIG. 4, the photoelectric conversion element PD may be a light-receiving diode including a sensing anode, a sensing cathode, and a photoelectric conversion layer, which is disposed between the sensing anode and the sensing cathode. The photoelectric conversion element PD may convert light incident thereupon from the outside into an electrical signal. The photoelectric conversion element PD may be an inorganic light-receiving diode formed of a PN- or PIN-type inorganic material or may be a phototransistor. Alternatively, photoelectric conversion element PD may be an organic light-receiving diode including an electron donating material, which generates donor ions, and an electron accepting material, which generates acceptor ions. The sensing anode of the photoelectric conversion element PD may correspond to a first electrode 180 of FIG. 5, and the sensing cathode of the photoelectric conversion element PD may correspond to the common electrode 190 of FIG. 5.

The sensing anode of the photoelectric conversion element PD may be connected to a first node N1 and a first electrode of the sensing capacitor Cph, and the sensing cathode of the photoelectric conversion element PD may be connected to a second node N2 and a second electrode of the sensing capacitor Cph.

The photoelectric conversion element PD may generate photocharges when exposed to external light, and the photocharges may accumulate in the sensing anode of the photoelectric conversion element PD. In this case, the voltage of the first node N1, which is electrically connected to the sensing anode of the photoelectric conversion element PD, may increase. When the photoelectric conversion element PD and the read-out line ROL are connected in response to the first and second sensing transistors LT1 and LT2 being turned on, a sensing voltage may accumulate in a third node N3 between the read-out line ROL and the second sensing transistor LT2 in proportion to the voltage of the first node N1 where the photocharges accumulate.

The first sensing transistor LT1 may be turned on by the voltage of the first node N1, which is applied to a gate electrode of the first sensing transistor LT1, to connect the first initialization voltage line VIL1 and a second electrode of the second sensing transistor LT2. In this case, a second electrode of the first sensing transistor LT1 may be discharged to a voltage as low as the first initialization voltage VINT.

The gate electrode of the first sensing transistor LT1 may be connected to the first node N1, a first electrode of the first sensing transistor LT1 may be connected to the first initialization voltage line VIL1, and the second electrode of the first sensing transistor LT2 may be connected to a first electrode of the second sensing transistor LT2. The first sensing transistor LT1 may be a source follower amplifier generating a source-drain current in proportion to the amount of charge in the first node N1, input to the gate electrode of the first sensing transistor LT1. The first electrode of the first sensing transistor LT1 may be connected to the first initialization voltage line VIL1, but the present disclosure is not limited thereto. Alternatively, the first electrode of the first sensing transistor LT1 may be connected to the driving voltage line or the second initialization voltage line VIL2.

The second sensing transistor LT2 may be turned on by a second scan write signal from the second scan write line GWL2 to connect the second electrode of the first sensing transistor LT1 and the read-out line ROL. A gate electrode of the second sensing transistor LT2 may be connected to the second scan write line GWL2, the first electrode of the second sensing transistor LT2 may be connected to the second electrode of the first sensing transistor LT1, and the second electrode of the second sensing transistor LT2 may be connected to the third node N3 and the read-out line ROL. The second sensing transistor LT2 may transmit the sensing current generated in the first sensing transistor LT1, to the read-out line ROL, and the sensing voltage may accumulate in the third node N3. The sensing voltage in the third node N3 may be transmitted to the read-out circuit 40 of FIG. 2 through the read-out line ROL.

The third sensing transistor LT3 may be turned on by a reset signal from the reset line RSTL to reset the first node N1 to the first-level voltage VGL. A gate electrode of the third sensing transistor LT3 may be connected to the reset line RSTL, a first electrode of the third sensing transistor LT3 may be connected to the first-level volage line VGLL, and a second electrode of the third sensing transistor LT3 may be connected to the first node N1. The third sensing transistor LT3 may be a reset transistor being turned on by the reset signal and resetting the sensing anode of the photoelectric conversion element PD and the first electrode of the sensing capacitor Cph through the first node N1.

The sensing capacitor Cph may be formed between the first and second nodes N1 and N2. The first electrode of the sensing capacitor Cph may be connected to the sensing anode of the photoelectric conversion element PD, the gate electrode of the first sensing transistor LT1, and the second electrode of the third sensing transistor LT3 through the first node N1, and the second electrode of the sensing capacitor Cph may be connected to the common voltage line through the second node N2. As a result, the sensing capacitor Cph may maintain the difference in electric potential between the first and second nodes N1 and N2.

The first and second sensing transistors LT1 and LT2 may be P-type MOSFETs having their channels formed of a polycrystalline semiconductor such as, for example, polycrystalline silicon or amorphous silicon, and the third sensing transistor LT3 may be, but is not limited to, an N-type MOSFET having its channel formed of an oxide semiconductor.

The first electrodes of the first and second sensing transistors LT1 and LT2 may be, but are not limited to, source electrodes, and the second electrodes of the first and second sensing transistors LT1 and LT2 may be, but are not limited to, drain electrodes. The first electrode of the third sensing transistor LT3 may be, but is not limited to, a drain electrode, and the second electrode of the third sensing transistor LT3 may be, but is not limited to a source electrode.

Figure 5:
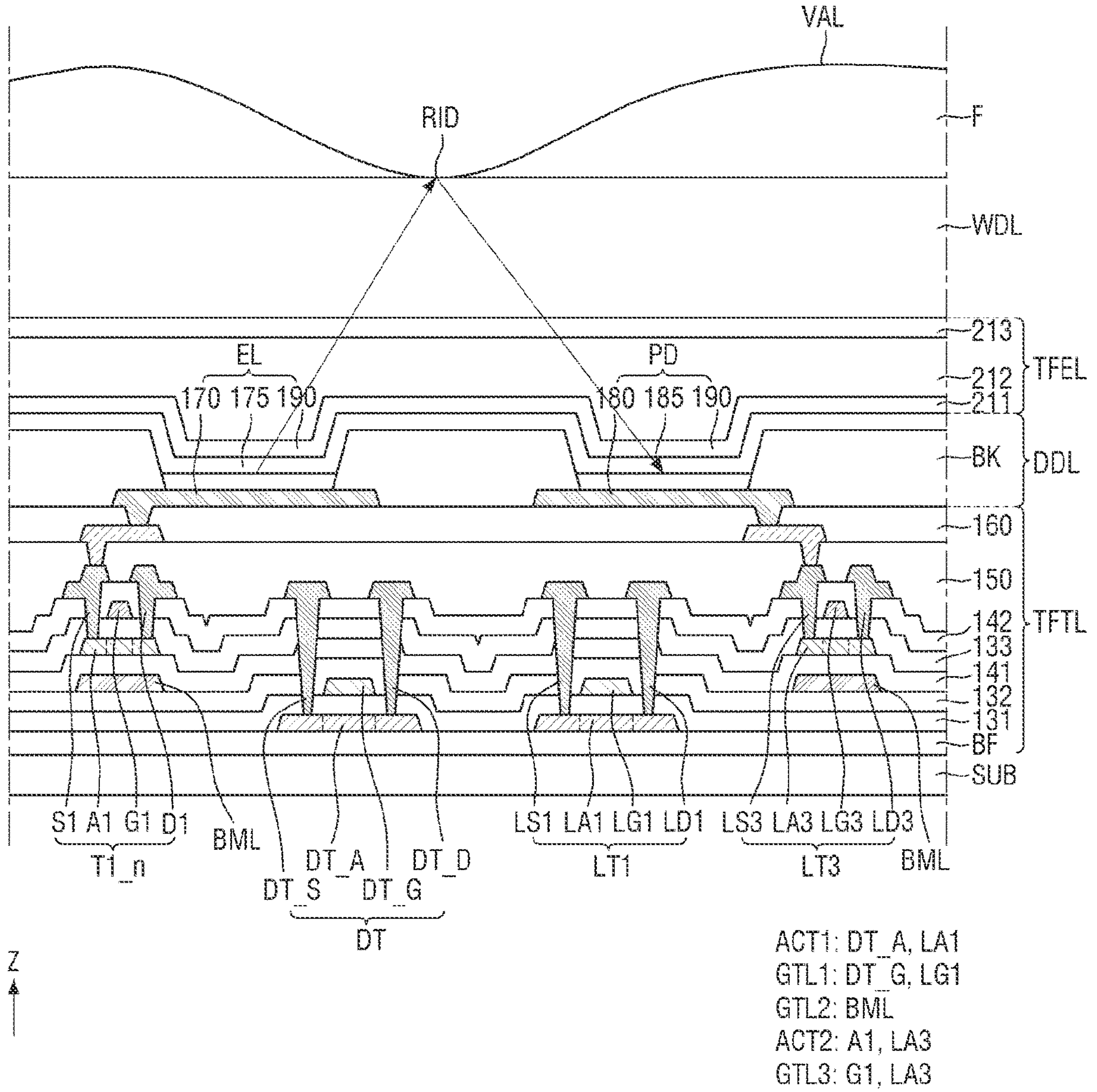
FIG. 5 is a cross-sectional view illustrating the pixel and the optical sensor of FIG. 4.

FIG. 5 is a cross-sectional view illustrating the pixel and the optical sensor of FIG. 4 according to an example embodiment.

FIG. 5 illustrates the driving transistor DT and the first sensing transistor LT1 of FIG. 4 as exemplary silicon transistors and the first transistor T1_*n* and the third sensing transistor LT3 as exemplary oxide transistors. The second, fifth, sixth transistors T2, T5, and T6 and the second sensing transistor LT, which are silicon transistors, may have substantially the same stack structure as the driving transistor DT, and the third and fourth transistors T3 and T4, which are oxide transistors, may have substantially the same stack structure as the first transistor T1_*n*.

The display device 1 may include a substrate SUB, a buffer layer BF, a TFT layer TFTL, a light-emitting element layer DDL, an encapsulation layer TFEL, and a window WDL. The TFT layer TFTL may include a first semiconductor layer ACT1, a first gate insulating film 131, a first gate layer GTL1, a second gate insulating film 132, a second gate layer GTL2, a first interlayer insulating film 141, a second semiconductor layer ACT2, a third gate insulating film 133, a third gate layer GTL3, a second interlayer insulating film 142, a first data conductive layer, a first planarization film 150, a second data conductive layer, and a second planarization film 160.

The substrate SUB may be a base substrate and may be formed of an insulating material such as a polymer resin. For example, the substrate SUB may be a flexible substrate that is bendable, foldable, or rollable.

The buffer layer BF may be formed on one surface of the substrate SUB. The buffer layer BF may be formed on the surface of the substrate SUB to protect TFTs and an organic light-emitting layer 175 and a photoelectric conversion layer 185 of the light-emitting element layer DDL from moisture that may penetrate the substrate SUB, which is susceptible to moisture.

The first semiconductor layer ACT1 may be disposed on the substrate SUB or the buffer layer BF. The first semiconductor layer ACT1 may be formed of a silicon-based material. For example, the first semiconductor layer ACT1 may be formed of low-temperature polysilicon (LTPS). The first semiconductor layer ACT1 may include a driving channel DT_A of the driving transistor DT and a channel LA1 of the first sensing transistor LT1.

The first gate insulating film 131 may cover the buffer layer BF and the first semiconductor layer ACT1 and may insulate the first semiconductor layer ACT1 and the first gate layer GTL1. The first gate insulating film 131 may be formed as an inorganic film such as a silicon nitride layer, a silicon oxynitride layer, a silicon oxide layer, a titanium oxide layer, or an aluminum oxide layer.

The first gate layer GTL1 may be disposed on the first gate insulating film 131. The first gate layer GTL1 may include a gate electrode DT_G of the driving transistor DT and a gate electrode LG1 of the first sensing transistor LT1. The gate electrode DT_G of the driving transistor DT may be formed to overlap with the driving channel DT_A, and the gate electrode LG1 of the first sensing transistor LT1 may be formed to overlap with the channel LA1. For example, the gate electrode DT_G may overlap the driving channel DT_A in a plan view and the gate electrode LG1 may be formed to overlap with the channel LA1 in a plan view. The first gate layer GTL1 may be formed as a single layer or a multilayer including molybdenum (Mo), aluminum (Al), chromium (Cr), gold (Au), titanium (Ti), nickel (Ni), neodymium (Nd), copper (Cu), or an alloy thereof.

The second gate insulating film 132 may cover the first gate layer GTL1 and the first gate insulating film 131. The second gate insulating film 132 may insulate the first and second gate layers GTL1 and GTL2. The second gate insulating film 132 may include the same material as the first gate insulating film 131. In an embodiment, the second gate insulating film 132 is entirely made of a single material and the first gate insulating film 131 is entirely made of the same single material.

The second gate layer GTL2 may be disposed on the second gate insulating film 132. The second gate layer GTL2 may include a light-blocking layer BML. The light-blocking layer BML may prevent or suppress light incident from below the display panel 10 from entering the second semiconductor layer ACT2. For example, the light-blocking layer BML may be disposed to overlap with a channel A1 of the first transistor T1_*n* or a channel LA3 of the third sensing transistor LT3 in the third direction Z. Since the gate electrode G1 of the first transistor T1_*n* is connected to the emission control line EML of FIG. 4, part of the light-blocking layer BML below the channel A1 of the first transistor T1_*n* may be part of the emission control line EML and may form a lower gate electrode of the first transistor T1_*n*. The second gate layer GTL2 may include the same material as the first gate layer GTL1. In an embodiment, the second gate layer GTL2 is entirely made of a single material and the first gate layer GTL1 is entirely made of the same single material.

The first interlayer insulating film 141 may cover the second gate layer GTL2 and the second gate insulating film 132. The first interlayer insulating film 141 may insulate the second gate layer GTL2 and the second semiconductor layer 132. The first interlayer insulating film 141 may be formed of an inorganic film such as a silicon nitride layer, a silicon oxynitride layer, a silicon oxide layer, a titanium oxide layer, or an aluminum oxide layer.

The second semiconductor layer ACT2 may be disposed on the first interlayer insulating film 141. For example, the second semiconductor layer ACT2 may be formed of an oxide-based material. The second semiconductor layer ACT2 may include the channel A1 of the first transistor T1_*n* and the channel LA3 of the third sensing transistor LT3.

The third gate insulating film 133 may cover the first interlayer insulating film 141 and the second semiconductor layer ACT2 and may insulate the second semiconductor layer ACT2 and the third gate layer GTL3. The third gate insulating film 133 may include the same material as the first gate insulating film 131. In an embodiment, the third gate insulating film 133 is entirely made of a single material and the first gate insulating film 131 is entirely made of the same single material.

The third gate layer GTL3 may be disposed on the third gate insulating film 133. The third gate layer GTL3 may include the gate electrode G1 of the first transistor T1_*n* and a gate electrode LG3 of the third sensing transistor LT3. The gate electrode G1 of the first transistor T1_*n* may be formed to overlap with the channel A1, and the gate electrode LG3 of the third sensing transistor LT3 may be formed to overlap with the channel LA3. The third gate layer GTL3 may include the same material as the first gate layer GTL1. The gate electrode G1 of the first transistor T1_*n* may be part of the emission control line EML and may be an upper gate electrode of the first transistor T1_*n*.

The first data conductive layer may be disposed on the second interlayer insulating film 142. The first data conductive layer DTL1 may include first and second electrodes DT_S and DT_D of the driving transistor DT, first and second electrodes LS1 and LD1 of the first sensing electrode LT1, first and second electrodes D1 and S1 of the first transistor T1_*n* and first and second electrodes LD3 and LS3 of the first sensing transistor LT1. The first data conductive layer may be formed as a single layer or a multilayer including Mo, Al, Cr, Au, Ti, Ni, Nd, Cu, or an alloy thereof.

The first planarization film 150 may cover the first data conductive layer and the second interlayer insulating film 142. The first planarization film 150 may planarize any height differences formed by the first semiconductor layer ACT1, the first gate layer GTL1, the second gate layer GTL2, the second semiconductor layer ACT2, the third gate layer GTL3, and the first data conductive layer. The first planarization film 150 may be formed of an organic film including an acrylic resin, an epoxy resin, a phenolic resin, a polyamide resin, or a polyimide resin. The second data conductive layer may be formed on the first planarization film 150. The second planarization film 160 may cover the second data conductive layer and the first planarization film 150. The second planarization film 160 may planarize any height differences formed by the second data conductive layer. The second planarization film 160 may include the same material as the first planarization film 150. In an embodiment, the second planarization film 160 is entirely made of a single material and the first planarization film 150 is entirely made of the same single material The light-emitting element layer DDL may be disposed on the TFT layer TFTL. The light-emitting element layer DDL may include a light-emitting element EL, a photoelectric conversion element PD, and a bank layer BK. The light-emitting element EL may include a pixel electrode 170, the organic light-emitting layer 175, and a common electrode 190, and the photoelectric conversion element PD may include a first electrode 180, a photoelectric conversion layer 185, and the common electrode 190.

The pixel electrode 170 of the light-emitting element EL may be disposed on the second planarization film 160. The pixel electrode 170 may be provided in each pixel PX. The pixel electrode 170 may be connected to the first electrodes DT_S and D1 and the second electrodes DT_D and S1 through contact holes penetrating the second planarization film 160.

The pixel electrode 170 of the light-emitting element EL may have, but is not limited to, a single-layer structure including Mo, Ti, Cu, or Al or a stack- or multilayer structure including indium tin oxide (ITO), indium zinc oxide (IZO), zinc oxide (ZnO), indium oxide ($In_2O_3$), silver (Ag), magnesium (Mg), Al, platinum (Pt), lead (Pb), gold (Au), or nickel (Ni), such as ITO/Mg, ITO/MgF, ITO/Ag, or ITO/Ag/ITO.

The first electrode 180 of the photoelectric conversion element PD may be disposed on the second planarization film 160. The first electrode 180 of the photoelectric conversion element PD may be provided in each optical sensor PS. The first electrode 180 of the photoelectric conversion element PD may be connected to the first electrodes LS1 and LD3 and the second electrodes LD1 and LS3 through contact holes penetrating the second planarization film 160.

The first electrode 180 of the photoelectric conversion element PD may have, but is not limited to, a single-layer structure including Mo, Ti, Cu, or Al or a multilayer structure such as ITO/Mg, ITO/MgF, ITO/Ag, or ITO/Ag/ITO.

The bank layer BK may be disposed on the pixel electrode 170 and the first electrode 180. The bank layer BK may form an opening in an area overlapping with the pixel electrode 170 and may expose the pixel electrode 170. An area where the pixel electrode 170 and the organic light-emitting layer 175 overlap with each other may be defined as an emission area emitting light, and the color of the light may differ from one pixel PX to another pixel PX.

The bank layer BK may also form an opening in an area overlapping with the first electrode 180 and may expose the first electrode 180. The opening exposing the first electrode 180 may provide space in which the photoelectric conversion layer 185 is formed, and an area where the first electrode 180 and the photoelectric conversion layer 185 overlap with each other may be defined as an optical sensing area.

The bank layer BK may include an organic insulating material such as an acrylic resin, an epoxy resin, a phenolic resin, a polyamide resin, a polyimide resin, an unsaturated polyester resin, a polyphenylene resin, a polyphenylene sulfide resin, or benzocyclobutene (BCB). Alternatively, the bank layer BK may include an inorganic material such as silicon nitride.

The organic light-emitting layer 175 may be disposed on the pixel electrode 170 of the light-emitting element EL, exposed by the bank layer BK. The organic light-emitting layer 175 may include a high-molecular material or a low-molecular material and may emit red, green, or blue light. The light emitted by the organic light-emitting layer 175 may contribute to the display of an image or may serve as a source of incident light for each optical sensor PS. For example, green-wavelength light emitted by a second-color pixel G may function as a source of incident light for each optical sensor PS.

In a case where the organic light-emitting layer 175 is formed of an organic material, a hole injection layer (HIL) and a hole transport layer (HTL) may be disposed below the organic light-emitting layer 175, and an electron injection layer (EIL) and an electron transport layer (ETL) may be stacked on the organic light-emitting layer 175. The HIL, the HTL, the EIL, and the ETL may be formed as single layers or multilayers including an organic material.

The photoelectric conversion layer 185 may be disposed on the first electrode 180 of the photoelectric conversion element PD, exposed by the bank layer BK. The photoelectric conversion layer 185 may generate photocharges in proportion to the amount of light incident thereupon. The incident light may be light originally emitted from the organic light-emitting layer 175 and then reflected to enter the organic light-emitting layer 175 again or may be light provided from the outside, regardless of the organic light-emitting layer 175. Photocharges generated and accumulated in the photoelectric conversion layer 185 may be converted into electrical signals for optical sensing.

The photoelectric conversion layer 185 may include an electron donating material and an electron accepting material. The electron donating material may generate donor ions in response to light, and the electron accepting material may generate acceptor ions in response to light. In a case where the photoelectric conversion layer 185 is formed of an organic material, the electron donating material may include a compound such as sub-phthalocyanine (SubPc), di-butyl-phosphate (DBP), but the present disclosure is not limited thereto. The electron accepting material may include a compound such as fullerene, a fullerene derivative, or perylene diimide, but the present disclosure is not limited thereto.

Alternatively, in a case where the photoelectric conversion layer 185 is formed of an inorganic material, the photoelectric conversion element PD may be a PN- or PIN-type phototransistor. For example, the photoelectric conversion layer 185 may have a structure where an N-type semiconductor layer, an I-type semiconductor layer, and a P-type semiconductor layer are sequentially stacked.

In a case where the photoelectric conversion layer 185 is formed of an organic material, an HIL and an HTL may be disposed below the photoelectric conversion layer 185, and an EIL and an ETL may be stacked on the photoelectric conversion layer 185. The HIL, the HTL, the EIL, and the ETL may be formed as single layers or multilayers including an organic material.

The common electrode 190 may be disposed on the organic light-emitting layer 175, the photoelectric conversion layer 185, and the bank layer BK. The common electrode 190 may be disposed over multiple pixels PX and multiple optical sensors PS to cover the organic light-emitting layer 175, the photoelectric conversion layer 185, and the bank layer BK. The common electrode 190 may include a conductive material with a low work function such as, for example, Li, Ca, LiF/Ca, LiF/Al, Al, Mg, Ag, Pt, Pd, Ni, Au Nd, Ir, Cr, BaF, Ba, or a compound or mixture thereof (e.g., the mixture of Ag and Mg). Alternatively, the common electrode 190 may include a transparent metal oxide such as ITO, IZO, or ZnO.

The photoelectric conversion element PD and the light-emitting element EL may share the common electrode 190, which is disposed on the photoelectric conversion layer 185 and the organic light-emitting layer 175, but the present disclosure is not limited thereto.

The encapsulation layer TFEL may be disposed on the light-emitting element layer DDL. The encapsulation layer TFEL may include at least one inorganic film for preventing the infiltration of oxygen or moisture into the organic light-emitting layer 175 and the photoelectric conversion layer 185. The encapsulation layer TFEL may also include at least one organic film for protecting the organic light-emitting layer 175 and the photoelectric conversion layer 185 from a foreign material such as dust. For example, the encapsulation layer TFEL may have a structure where a first inorganic film 211, an organic film 212, and a second inorganic film 213 are sequentially stacked. The first and second inorganic films 211 and 213 may be formed as multilayer films in which at least one inorganic film from among a silicon nitride layer, a silicon oxynitride layer, a silicon oxide layer, a titanium oxide layer, and an aluminum oxide layer is alternately stacked. The organic film 212 may be formed of an acrylic resin, an epoxy resin, a phenolic resin, a polyamide resin, or a polyimide resin.

The window WDL may be disposed on the encapsulation layer TFEL. The window WDL may include a rigid material such as glass or quartz. The window WDL may be a protective member for protecting the elements of the display device 1. The window WDL may be attached on the encapsulation layer TFEL via an optically clear adhesive (OCA) or the like.

FIG. 5 illustrates a finger of the user being in contact with the window WDL, and a fingerprint F may include ridges RID having a particular pattern and a valleys VAL between the ridges RID. When the fingerprint F is in contact with the top surface of the window WDL, the ridges RID may be in contact with the top surface of the window WDL, but the valleys VAL may not be in contact with the top surface of the window WDL. That is, the top surface of the window WDL may be in contact with air in the valleys.

When the fingerprint F is in contact with the top surface of the window WDL, light emitted from the emission area of each pixel PX may be reflected by the ridges RID and the valleys VAL of the fingerprint F. Since the fingerprint F has a different refractive index from the air, the amount of light reflected from the ridges RID may differ from the amount of light reflected from the valleys VAL. Accordingly, the ridges RID and the valleys VAL of the fingerprint F may be detected based on the difference in the amount of light incident upon each optical sensor PS. Since each optical sensor PS outputs an electrical signal based on the difference in the amount of light incident thereupon (or in a photocurrent), the pattern of the fingerprint F can be identified.

Figure 6:
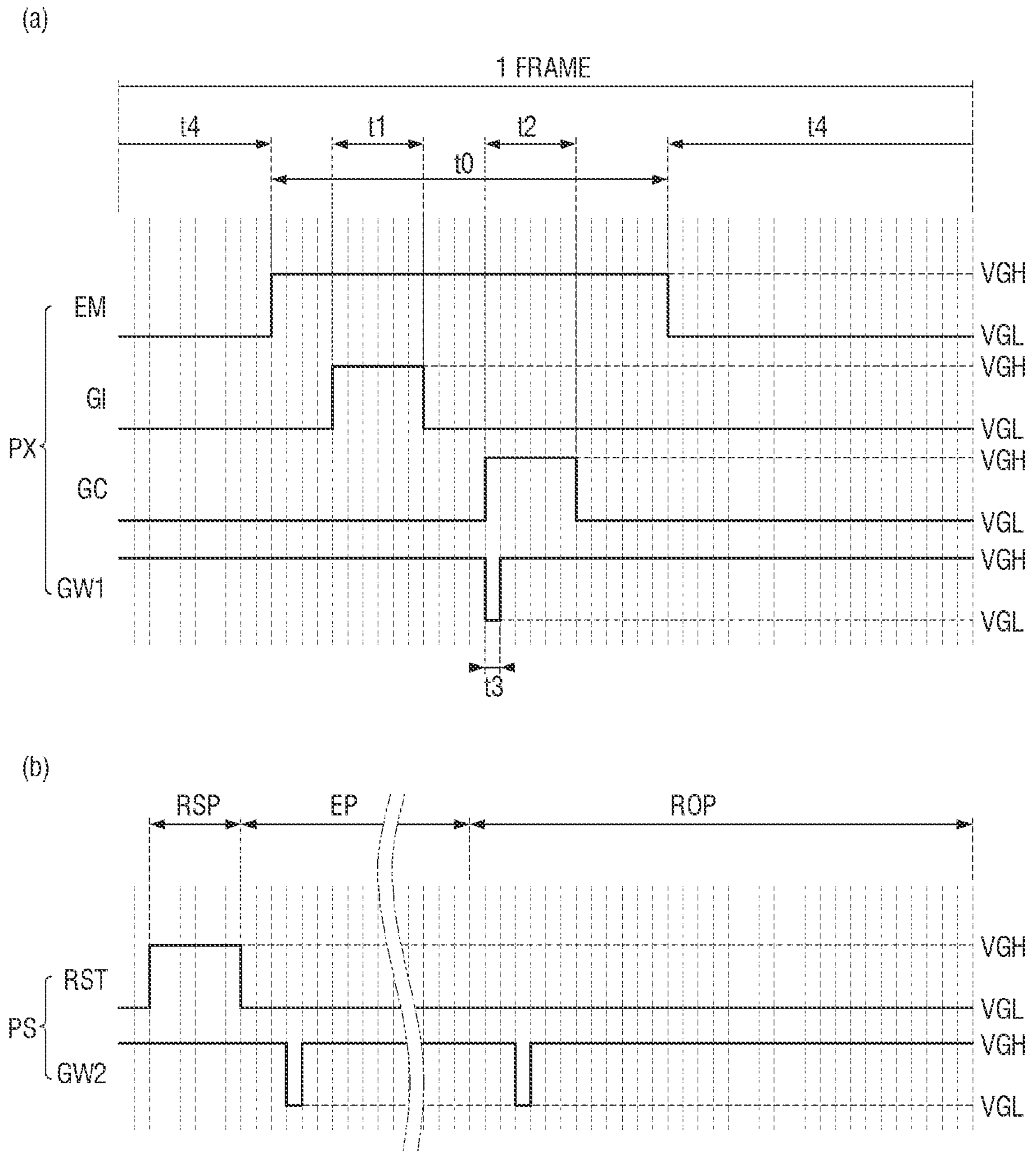
FIG. 6 shows signals applied to the pixel and to the optical sensor of FIG. 4.

FIG. 6 shows signals applied to the pixel and to the optical sensor of FIG. 4. FIG. 6(*a*) is a timing diagram showing signals applied to the pixel of FIG. 4, and FIG. 6(*b*) is a timing diagram of signals applied to the optical sensor of FIG. 4.

Referring to FIG. 6 and further to FIG. 4, the emission control signal EM, which is applied to the emission control line EML, may be a signal for controlling the turning on or off of the first, second, and fifth transistors T1_*n*, T2, and T5. The scan initialization signal GI, which is applied to the scan initialization line GIL, may be a signal for controlling the turning on or off of the fourth transistor T4. The scan control signal GC, which is applied to the scan control line GCL, may be a signal for controlling the turning on or off of the third transistor T3. The first scan write signal GW1, which is applied to the first scan write line GWL1, may be a signal for controlling the turning on or off of the sixth transistor T6. The second scan write signal GW2, which is applied to the second scan write line GWL2, may be a signal for controlling the turning on or off of the second sensing transistor LT2. The reset signal RST, which is applied to the reset line RSTL, may be a signal for controlling the turning on or off of the third sensing transistor LT3.

Referring to FIG. 6(*a*), the emission control signal EM, the scan initialization signal G, the scan control signal GC, and the first scan write signal GW1 may repeat at intervals of a frame or a frame period. Here, the frame or frame period may be divided into a first period t1 during which the voltage of the gate electrode DT_G of the driving transistor DT is initialized to the first initialization voltage VINT, a second period t2 during which a data voltage is supplied to the first electrode DT_S of the driving transistor DT and the threshold voltage of the driving transistor DT is sampled, a third period t3 during which a data voltage is supplied to the first electrode DT_S of the driving transistor DT and the threshold voltage of the driving transistor DT is sampled, and a fourth period t4 during which the light-emitting element EL emits light. An initialization period t0 during which the voltage of the anode of the light-emitting element EL is initialized to the second initialization voltage VAINT may be included in a non-emission period when the light-emitting element EL does not emit.

The scan initialization signal GI may have the second-level voltage VGH during the first period t1 and the first-level voltage VGL during the rest of the frame. The scan control signal GC may have the second-level voltage VGH during the second period t2 and the first-level voltage VGL during the rest of the frame. The first scan write signal GW1 may have the first-level voltage VGL during the third period t3 and the second-level voltage VGH during the rest of the frame. The emission control signal EM may have the first-level voltage VGL during the fourth period t4 and the second-level voltage VGH during the initialization period t0. The first-level voltage VGL may be a gate-low voltage, and the second-level voltage VGH may be a gate-high voltage higher than the gate-low voltage.

During the first period t1, a scan initialization signal GI having the second-level voltage VGH is applied to the scan initialization line GIL. During the first period t1, the fourth transistor T4 is turned on by the scan initialization signal GI. In response to the fourth transistor T4 being turned on, the gate electrode DT_G of the driving transistor DT may be initialized to the first initialization voltage VINT of the first initialization voltage line VIL1.

During the second period t2, a scan control signal GC having the second-level voltage VGH is applied to the scan control line GCL. Then, the third transistor T3, which is connected to the scan control line GCL, is turned on. As a result, the gate electrode DT_G and the DT_D of the driving transistor DT are connected to one another, and the driving transistor DT operates as a diode.

During the third period t3, a first scan write signal GW1 having the first-level voltage VGL is applied to the first scan write line GWL1. Then, the sixth transistor T6, which is connected to the first scan write line GWL1, is turned on, and the data voltage Vdata is supplied to the first electrode DT_S of the driving transistor DT. Since the voltage between the first electrode DT_S and the gate electrode DT_G of the driving transistor DT, i.e., the source-gate voltage Vsg, is less than the absolute value of the threshold voltage Vth, a current path may be formed until the source-gate voltage Vsg reaches the absolute value of the threshold voltage Vth. As a result, the voltages of the gate electrode DT_G and the first electrode DT_S of the driving transistor DT rise up to the difference between the data voltage Vdata and the absolute value of the threshold voltage Vth, i.e., Vdata−|Vth|. In this case, Vdata−|Vth| may be stored in the first capacitor Cst.

When the driving transistor DT is a P-type transistor, the driving current Isd of the driving transistor DT may be proportional to the voltage between the source and drain electrodes of the driving transistor DT, i.e., a source-drain voltage Vsg, during a period when the source-drain voltage Vsg is greater than 0V. Also, the threshold voltage Vth of the driving transistor DT may be less than 0V.

The first transistor T1_*n* may receive the same emission control signal EM as the second and fifth transistors T2 and T5, but may be turned on at a different time from the second and fifth transistors T2 and T5 because the first transistor T1_*n* is an N-type transistor, whereas the second and fifth transistors T2 and T5 are P-type transistors. That is, an initialization operation by the first transistor T1_*n* may not be performed when the second and fifth transistors T2 and T5 are turned on, but may be performed during an emission period when the second and fifth transistors T2 and T5 are turned off.

Specifically, during the initialization period t0, an emission control signal EM having the second-level voltage VGH is applied to the emission control line EML. During the initialization period t0, the emission control signal EM may have a pulse rising from the first-level voltage VGL to the second-level voltage VGH. For example, the emission control signal EM may transition from the first-level voltage VGL to the second-level voltage VGH during a start of the initialization period t0. As a result, the first transistor T1_*n*, which is connected to the emission control line EML, is turned on, and the anode of the light-emitting element EL is initialized to the second initialization voltage VAINT of the second initialization voltage line VIL2. The second and fifth transistors T2 and T5 are turned off.

During the fourth period t4, an emission control signal EM having the first-level voltage VGL is applied to the emission control line EML. During the fourth period t4, the emission control signal EM may have a pulse falling from the second-level voltage VGH to the first-level voltage VGL. For example, the emission control signal EM may transition from the second-level voltage VGH to the first-level voltage VGL at an end of the initialization period t0 or at a start of the fourth period t4. The second and fifth transistors T2 and T5, which are connected to the emission control line EML, are turned on by the emission control signal EM. When the fifth transistor T5 is turned on, the first electrode DT_S of the driving transistor DT is connected to the driving voltage line, and when the second transistor T2 is turned on, the second electrode DT_D of the driving transistor DT is connected to the anode of the light-emitting element EL. The first transistor T1_*n* is turned off.

When the second and fifth transistors T2 and T5 are turned on, the driving current Isd, which flows in accordance with the voltage of the gate electrode of the driving transistor DT, may be provided to the light-emitting element EL. The driving current Isd may not be dependent on the threshold voltage of the driving transistor DT, as indicated by Equation (2):

$$Isd = k' \times (ELVDD - Vdata)^2 \quad (2)$$

where k' is a proportionality coefficient determined by the structure and physical characteristics of the driving transistor DT, ELVDD is the driving voltage from the driving voltage line, and Vdata is a data voltage. That is, referring to Equation (2), the threshold voltage Vth of the driving transistor DT can be compensated for, and the light-emitting element EL can emit light in accordance with the magnitude of the driving current Isd, which is controlled by the driving voltage ELVDD and the data voltage Vdata.

Referring to FIG. 6(*b*), the reset signal RST and the second scan write signal GW2 may repeat at intervals of a frame or a frame period. A frame during which each optical sensor PS operates may be independent of a frame during which each pixel PX operates, but the present disclosure is not limited thereto. Here, the frame or frame period for each optical sensor PS may be divided into a reset period RSP during which the sensing anode of the photoelectric conversion element PD is reset to the first-level voltage VGL, a light exposure period EP during which the photoelectric conversion element PD is exposed to external light and photocharges are generated in accordance with the magnitude of external light so that the voltage of the sensing anode of the photoelectric conversion element PD and the voltage of the first node N1 increase, and a fingerprint reading period ROP during which the second sensing transistor LT2 is turned on and a fingerprint is read based on the magnitude of a sensing current in the read-out line ROL.

The reset signal RST may have the second-level voltage VGH during the reset period RSP and the first-level voltage VGL during the rest of the frame. The second scan write signal GW2 may have the first-level voltage VGL and the second-level voltage VGH during each of the light exposure period EP and the fingerprint reading period ROP.

When the first transistor T1_*n* is an N-type transistor formed of an oxide semiconductor and the gate electrode G1 of the first transistor T1_*n* is connected to the emission control line EML, the first transistor T1_*n* may be turned on by the emission control signal EM having the second-level voltage VGH. Accordingly, the initialization of the anode of the light-emitting element EL may be performed regardless of the magnitude of the first-level voltage VGL. As will be described later, when the first-level voltage VGL increases, a dark current of the photoelectric conversion element PD decreases because the sensing anode of the photoelectric conversion element PD is connected to the first-level voltage line VGLL.

Thus, when the first transistor T1_*n*, which initializes the light-emitting element EL, is turned on by the second-level voltage VGH, which is irrelevant to the first-level voltage VGL, the initialization of the light-emitting element EL may be maintained even if the first-level voltage VGL is raised, and the dark current of the photoelectric conversion element PD can be reduced. If the initialization of the light-emitting element EL is maintained, the light-emitting element EL can display black gradation on the display panel 10 in response to a black voltage. For example, the black gradation may mean that a part of an image to be displayed on the display panel 10 is displayed with regions of different colors such as black and one or more dark grays instead of only black.

On the contrary, in a case where the first transistor T1_*n* is a P-type transistor, the light-emitting element EL may not be able to display black gradation, if the first-level voltage VGL is raised. For example, where the first transistor T1_*n* is a P-type transistor, the light-emitting element EL may display a solid black, if the first-level voltage VGL is raised.

Figure 7:
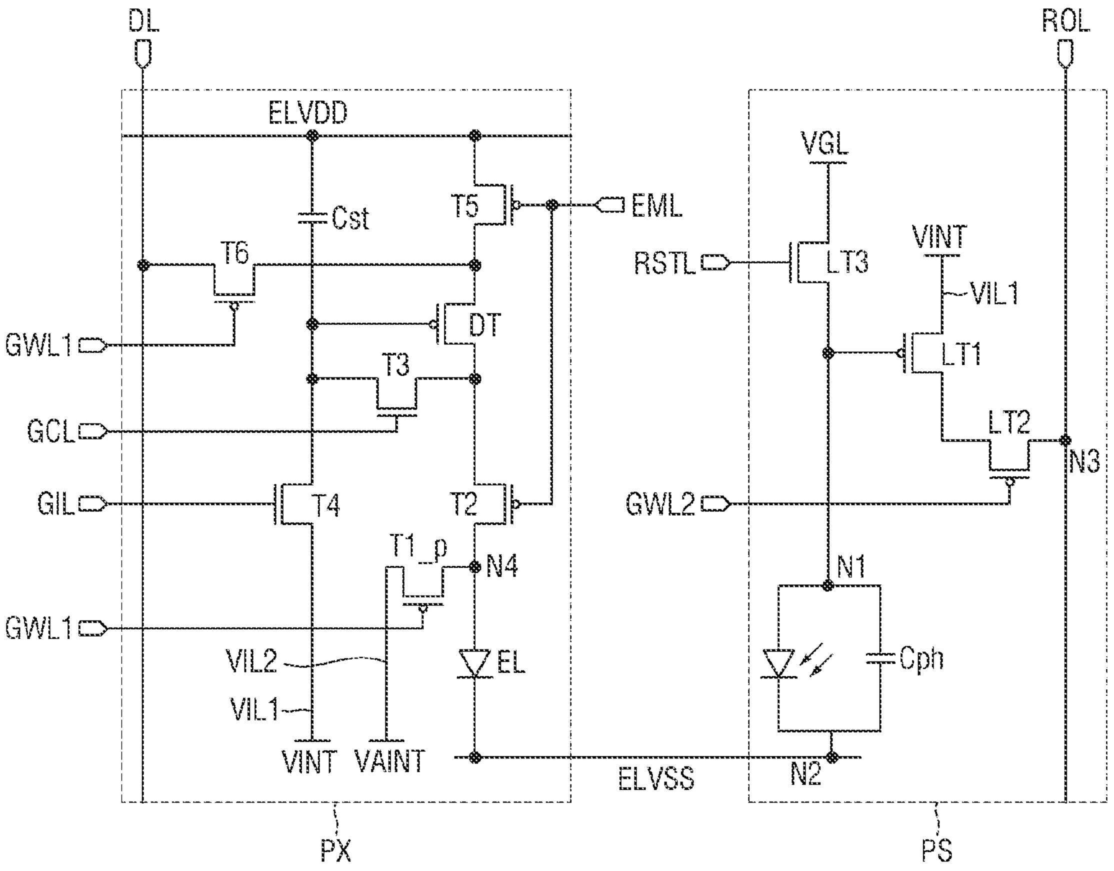
FIG. 7 is a circuit diagram of a pixel and an optical sensor of a display device according to an embodiment of the present disclosure.

A display device including a first transistor T1_p, which is a P-type transistor, will hereinafter be described with reference to FIG. 7. FIG. 7 is a circuit diagram of a pixel and an optical sensor of a display device according to an embodiment of the present disclosure.

Referring to FIG. 7, the first transistor T1_p, like the first transistor T1_n of FIG. 4, may initialize a fourth node N4, which is connected to the anode of a light-emitting element EL, to a second initialization voltage VAINT. The first transistor T1_p is a P-type transistor formed of a silicon semiconductor and is turned on by a first scan write signal GW1 from a first scan write line GWL1. Since the first transistor T1_p is a P-type transistor, the first transistor T1_p is turned on when the first scan write signal GW1 has a first-level voltage VGL. A gate electrode of the first transistor T1_p may be connected to the first scan write line GWL1, a first electrode of the first transistor T1_p may be connected to a second initialization voltage line VIL2, and a second electrode of the first transistor T1_p may be connected to the anode of the light-emitting element EL and the fourth node N4.

The first transistor T1_p, which is a P-type transistor, is turned on when the first-level voltage VGL is applied to the gate electrode of the first transistor T1_p. If the first-level voltage VGL is raised to reduce a dark current of a photoelectric conversion element PD, an initialization voltage for initializing the fourth node N4 may increase. Accordingly, the anode of the light-emitting element EL may have a higher voltage than the second initialization voltage VAINT. In a case where the anode of the light-emitting element EL has a higher voltage than the second initialization voltage VAINT, the light-emitting element EL may display a higher gradation than black gradation in response to a black voltage being applied to the anode of the light-emitting element EL. That is, the light-emitting element EL may emit a slight amount of light even in response to the black voltage.

Since the first transistor T1_n of FIG. 4 is an N-type transistor and is turned on by the second-level voltage VGH, the first transistor T1_n can initialize the anode of the light-emitting element EL to the second initialization voltage VAINT, even when the first-level voltage VGL increases. Thus, the display device 1 can display black gradation in response to a black voltage and can prevent any increase in black luminance.

The operations of an optical sensor PS during the reset period RSP, the light exposure period EP, and the fingerprint reading period ROP and the operating characteristics of a photoelectric conversion element PD will hereinafter be described with reference to FIGS. 8 through 13. Also, it will hereinafter be described how the display device 1, which includes the first transistor T1_n, can reduce the dark current of the photoelectric conversion element PD.

Figure 8:
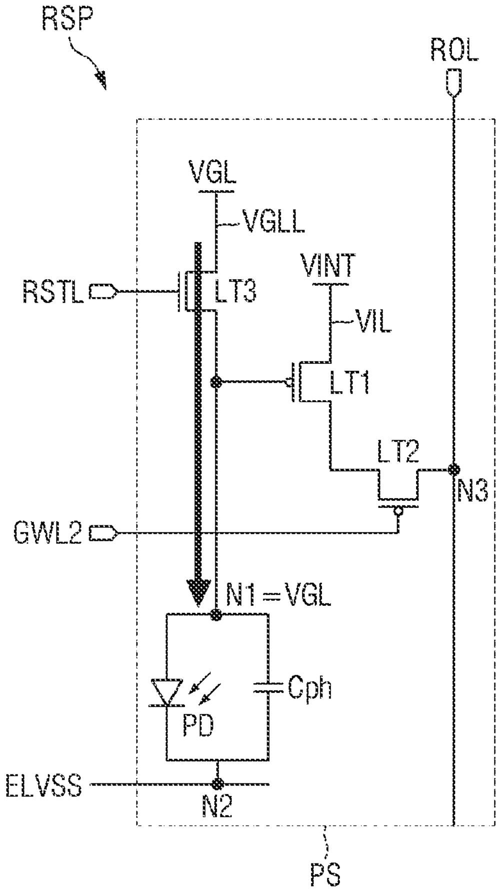
FIG. 8 is a circuit diagram for explaining how to drive an optical sensor during a reset period.
Figure 9:
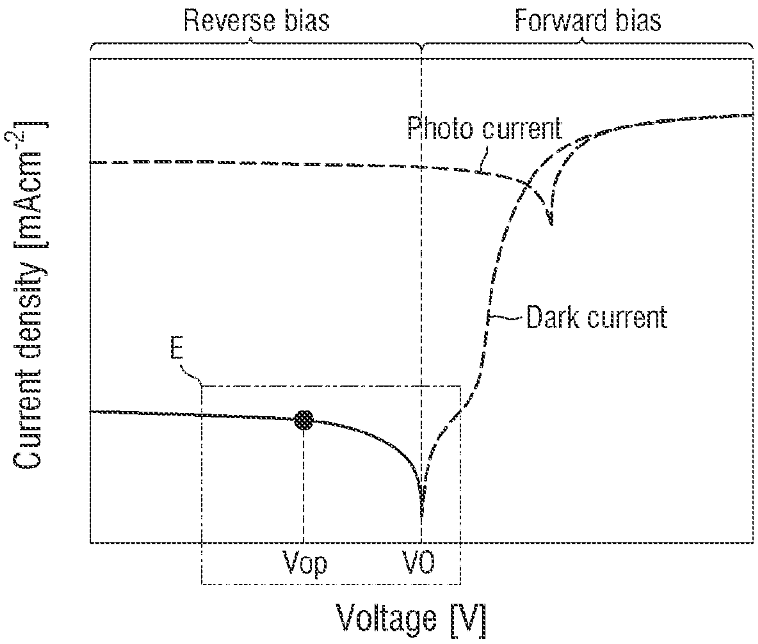
FIG. 9 is a graph showing the current-voltage curve of a photoelectric conversion element during the reset period.
Figure 10:
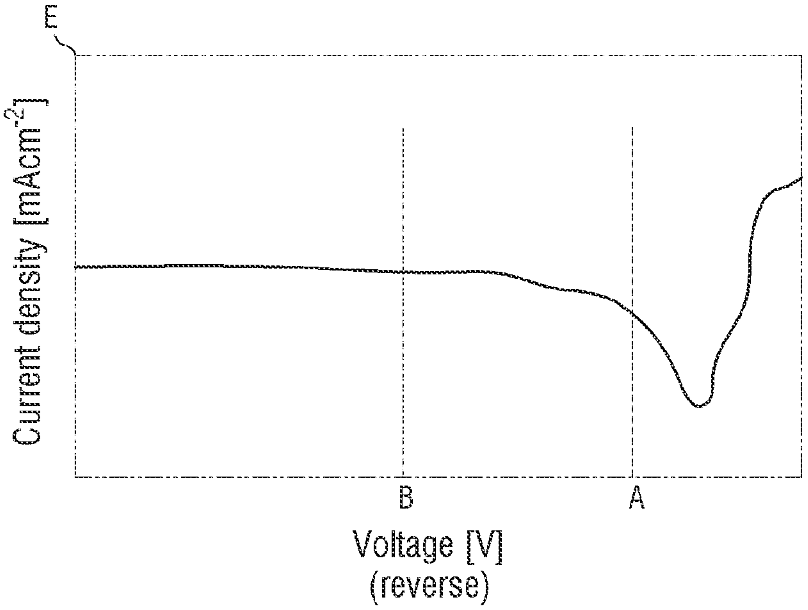
FIG. 10 is an enlarged graph showing part E of FIG. 9.

FIG. 8 is a circuit diagram for explaining how to drive an optical sensor PS during the reset period RSP. FIG. 9 is a graph showing the current-voltage curve of a photoelectric conversion element PD during the reset period RSP. FIG. 10 is an enlarged graph showing part E of FIG. 9.

Referring to FIGS. 8 through 10, during the reset period RSP, a reset signal RST having the second-level voltage VGH is applied to a reset line RSTL. As a result, a third sensing transistor LT3 is turned on, and a first node N1 and a sensing anode of the photoelectric conversion element PD are reset to the first-level voltage VGL of a first-level voltage line VGLL.

Referring to FIGS. 9 and 10, an X axis represents the difference between the voltage of the sensing anode of the photoelectric conversion element PD and the voltage of a sensing cathode of the photoelectric conversion element PD, and a Y axis represents a current density or a current for each voltage difference.

The photoelectric conversion element PD may need to be reverse-biased when it is yet to be exposed to light. In a reverse-biased state, the photoelectric conversion element PD may generate photocharges in accordance with the amount of external light, but in a forward-biased state, the photoelectric conversion element PD may operate as a typical diode without generating photocharges even when exposed to external light. Thus, during the reset period RSP, which is followed by the light exposure period EP, an operating point Vop, which corresponds to the difference in voltage between the sensing anode and the sensing cathode of the photoelectric conversion element PD, may be lower than a reference voltage V0. If the operating point Vop of the photoelectric conversion element PD is lower than the reference voltage V0, which is a reference voltage for the reverse-biased state, the photoelectric conversion element PD may be in the reverse-biased state. The reference voltage V0 may be 0 V, but the present disclosure is not limited thereto.

The first-level voltage VGL, which is applied to the first node N1, may be lower than the common voltage ELVSS, which is applied to a second node N2. For example, the common voltage ELVSS may be −4.6 V. If the first-level voltage VGL is −8 V, the operating point Vop of the photoelectric conversion element PD may be −3.4 V, and if the first-level voltage VGL is −6 V, the operating point Vop of the photoelectric conversion element PD may be −1.4 V. Since the operating point Vop of the photoelectric conversion element PD is lower than the reference voltage V0, the photoelectric conversion element PD may maintain its reverse-biased state.

In a case where the photoelectric conversion element PD operates in the reverse-biased state during the reset period RSP, the photoelectric conversion element PD generates a dark current corresponding to a leakage current. The dark current generated by the photoelectric conversion element PD before the exposure of the photoelectric conversion element PD to light may result in the deterioration of the performance of the photoelectric conversion element PD, for example, a decrease in the power consumption of the photoelectric conversion element PD. Thus, the less the dark current, the better the performance of the photoelectric conversion element PD. As the operating point Vop of the photoelectric conversion element PD increases, the dark current of the photoelectric conversion element PD may decrease. Specifically, the closer the operating point Vop of the photoelectric conversion element PD is to the reference voltage V0, the less the dark current of the photoelectric conversion element PD becomes. For example, as the first-level voltage VGL from the first-level voltage line VGLL, which is connected to the first node N1, increases, the operating point of the photoelectric conversion element PD may increase, and the dark current of the photoelectric conversion element PD may decrease.

According to the embodiment of FIG. 7, since the first transistor T1_p is a P-type transistor, the first transistor T1_p may be turned on in response to the first-level voltage VGL being applied to the gate electrode of the first transistor T1_p. That is, when the first-level voltage VGL increases, an initialization voltage for initializing the anode of the light-emitting element EL may increase, and a higher voltage than the second initialization voltage VAINT may be applied to the anode of the light-emitting element EL. That is, if the anode of the light-emitting element EL is not provided with a sufficient initialization voltage, the light-emitting element EL may display a higher gradation than black gradation in response to a black voltage. Thus, if the first-level voltage VGL is raised to reduce the dark current of the photoelectric conversion element PD, the light-emitting element EL may not be able to properly operate, and thus, there is a limit in raising the first-level voltage VGL. For example, if the first-level voltage VGL is −8 V, the light-emitting element EL can display black luminance, but if the first-level voltage VGL is −6 V, black luminance may increase. Accordingly, there is a limit in reducing the dark current of the photoelectric conversion element PD.

On the contrary, according to the embodiment of FIG. 4, since the first transistor T1_*n* is an N-type transistor, the first transistor T1_*n* may be turned on in response to the second-level voltage VGH being applied to the gate electrode of the first transistor T1_*n*. That is, the first transistor T1_*n* can be turned on, even when the first-level voltage VGL increases, and thus, the anode of the light-emitting element EL can be initialized to the second initialization voltage VAINT. As a result, even if the first-level voltage VGL, which is for resetting the sensing anode of the photoelectric conversion element PD, is raised to increase the operating point Vop of the photoelectric conversion element PD, the initialization of the light-emitting element EL can be maintained. That is, even if the first level-voltage VGL is raised to reduce the dark current of the photoelectric conversion element PD, the light-emitting element EL can properly display black luminance in response to a black voltage, and any increase in black luminance can be prevented. For example, even if the first-level voltage VGL is raised from −8 V to −6 V to reduce the dark current of the photoelectric conversion element PD, the light-emitting element EL can display black luminance.

Referring to FIG. 10, a first operating point A is an operating point Vop of the photoelectric conversion element PD of FIG. 4, and a second operating point B is the operating point Vop of the photoelectric conversion element PD of FIG. 7. For example, a dark current may be less at the first operating point A than at the second operating point B. The dark current may have an exponential curve near the first operating point A and may be maintained at a relatively uniform level near the second operating point B.

That is, according to the embodiment of FIG. 4, when the first transistor T1_*n* is formed as an N-type transistor including an oxide semiconductor, the operating point Vop of the photoelectric conversion element PD can be increased to the first operating point A, which is close to the reference voltage V0, and the dark current of the photoelectric conversion element PD can be reduced. Referring to FIG. 10, the first operating point A may be, but is not limited to, −1.4 V, and the second operating point B may be, but is not limited to, −3.4 V.

The operating voltage range of the photoelectric conversion element PD of FIG. 4 may be wider than the operating voltage range of the photoelectric conversion element PD of FIG. 7. The operating voltage range of the photoelectric conversion element PD of FIG. 4 or 7 may refer to the range of voltages below the operating point Vop of the photoelectric conversion element PD of FIG. 4 or 7. For example, the photoelectric conversion element PD of FIG. 4 may maintain its reverse-biased state when having a voltage difference of −1.4 V or less between the first and second nodes N1 and N2 thereof, whereas the photoelectric conversion element PD of FIG. 7 may maintain its reverse-biased state when having a voltage difference of −3.4 V or less between the first and second nodes N1 and N2 thereof. When there is a voltage difference of −1.4 V between the first and second nodes N1 and N2, the photoelectric conversion element PD of FIG. 7 may not be able to generate a photocurrent upon exposure to light, but the photoelectric conversion element PD of FIG. 4 can generate a photocurrent upon exposure to light. Accordingly, the operating voltage range of the photoelectric conversion element PD of FIG. 4 may be about 2 V wider than the operating voltage range of the photoelectric conversion element PD of FIG. 7.

Figure 11:
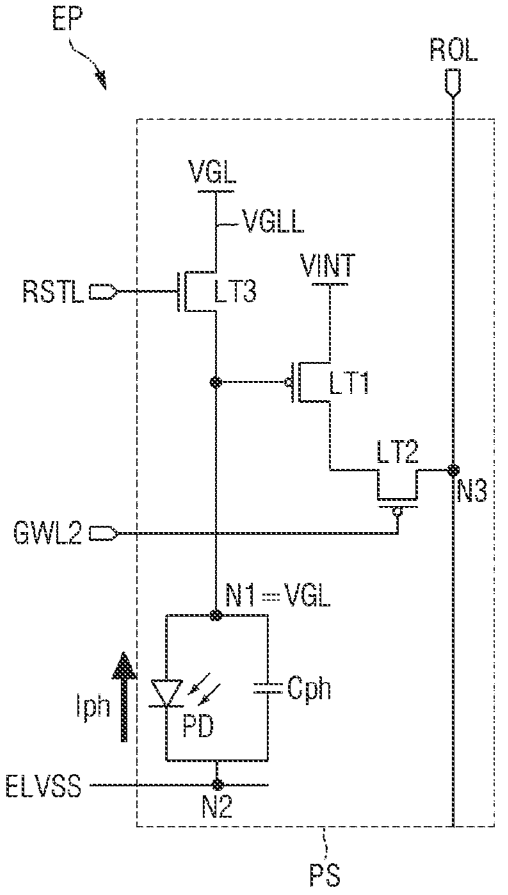
FIG. 11 is a circuit diagram for explaining how to drive an optical sensor during an exposure period.
Figure 12:
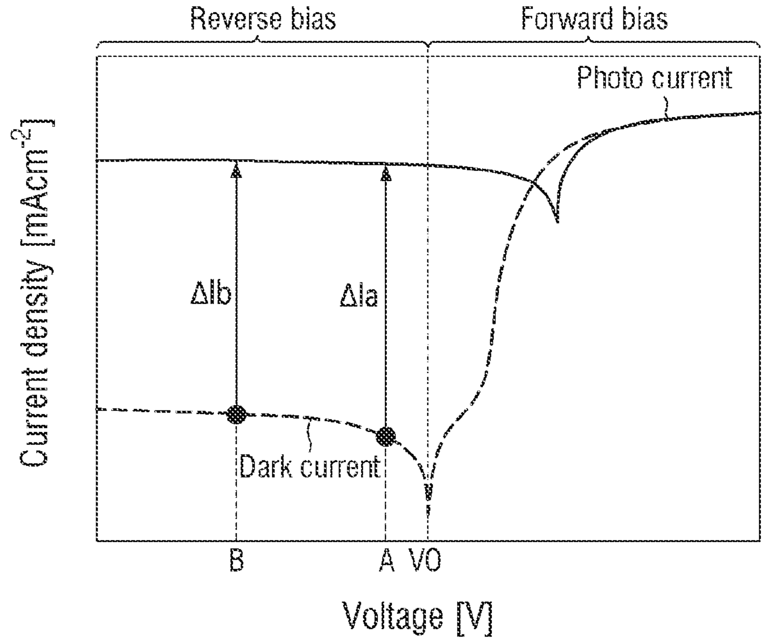
FIG. 12 is a graph showing the current-voltage curve of a photoelectric conversion element during the exposure period.

FIG. 11 is a circuit diagram for explaining how to drive an optical sensor PS during the exposure period EP. FIG. 12 is a graph showing the current-voltage curve of a photoelectric conversion element during the exposure period EP.

Referring to FIG. 11, during the light exposure period EP, a photoelectric conversion element PD where a reverse bias is generated may be exposed to external light emitted by a light-emitting element EL. In a case where a touch is made by the user, the photoelectric conversion element PD may generate photocharges corresponding to light reflected from the ridges RID or the valleys VAL of the fingerprint of the user and may generate a reverse current in proportion to the amount of photocharges generated. That is, a photocurrent Iph, which flows from a second node N2 to a first node N1, may be generated. As a result, the voltage of the first node N1 may increase. The voltage of the first node N1 may increase until the voltage between a first electrode and a gate electrode of a first sensing transistor LT1, i.e., a source-gate voltage Vsg, reaches the absolute value of a threshold voltage Vth of the first sensing transistor LT1. When the voltage of the first node N1 reaches the threshold voltage Vth, the first sensing transistor LT1 may be turned on. As the amount of charges charged in the first node N1 increases, a sensing current Irx of FIG. 9, which flows in the first sensing transistor LT1, increases, and thus, the light exposure period EP may be set to be sufficiently long.

Referring to FIG. 12, when the photoelectric conversion element PD is in a reverse-biased state, the lower an operating point Vop of the photoelectric conversion element PD, the less the amount of current variation in the photoelectric conversion element PD upon exposure to light. Here, the current variation may refer to a variation in the photocurrent Iph, which flows from the second node N2 to the first node N1. As the operating point Vop decrease, the photocurrent Iph increases, which is a reverse current of the photoelectric conversion element PD, the sensing current Irx, which flows in the first sensing transistor LT1, may increase. As a result, the amount of variation in a fingerprint sensing voltage detected by the optical sensor PS may increase, and fingerprint sensing may be accurately performed.

For example, a current variation ΔIa in a photoelectric conversion element PD having a first operating point A may be greater than a current variation ΔIb in a photoelectric conversion element PD having a second operating point B. In a case where each pixel PX includes the first transistor T1_*n*, the amount of variation in the photocurrent of each photoelectric conversion element PD may increase.

Figure 13:
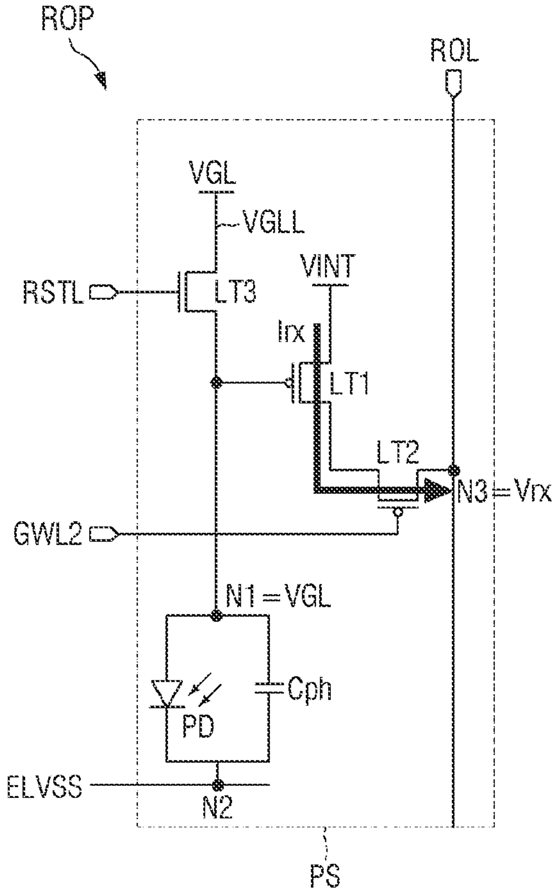
FIG. 13 is a circuit diagram for explaining how to drive an optical sensor during a fingerprint reading period.

FIG. 13 is a circuit diagram for explaining how to drive an optical sensor during the fingerprint reading period ROP.

Referring to FIG. 13, during the fingerprint reading period ROP, a second scan write signal GW2 having the first-level voltage VGL is applied to a second scan write line GWL2. As a result, a second sensing transistor LT2 may be turned on, and a sensing current Irx of a first sensing transistor LT1 may be output to a read-out line ROL through the second sensing transistor LT2. The sensing current Irx may be a source-drain current generated in proportion to the amount of charges in a first node N1, which are input to the gate electrode of the first sensing transistor LT1. Thus, the ridges or valleys of a fingerprint can be detected by detecting a voltage variation in the first node N1. During the fingerprint reading period ROP, a read-out circuit 40 of FIG. 14, which is connected to the read out line ROL, detects a fingerprint sensing signal from a sensing voltage Vrx, which is charged in a third node N3.

In short, according to the embodiment of FIG. 4, the first transistor T1_*n* may be formed as an N-type transistor including an oxide semiconductor. When the first transistor T1_*n* is turned on by the second-level voltage VGH, an increase in black gradation for a black voltage can be prevented, even if the first-level voltage VGL is raised. Also, in a case where the first-level voltage VGL is raised, the operating point of the photoelectric conversion element PD increases, and thus, the dark current of the photoelectric conversion element PD can be reduced. Accordingly, the power consumption of the photoelectric conversion element PD increases, and the performance of the photoelectric conversion element PD can be improved. Also, since the amount of variation in a photocurrent can be increased when a photoelectric conversion element PD having an operating point Vop close to the reference voltage V0 is exposed to light in a reverse-biased state, the optical sensitivity of the optical sensor PS can be increased.

Figure 14:
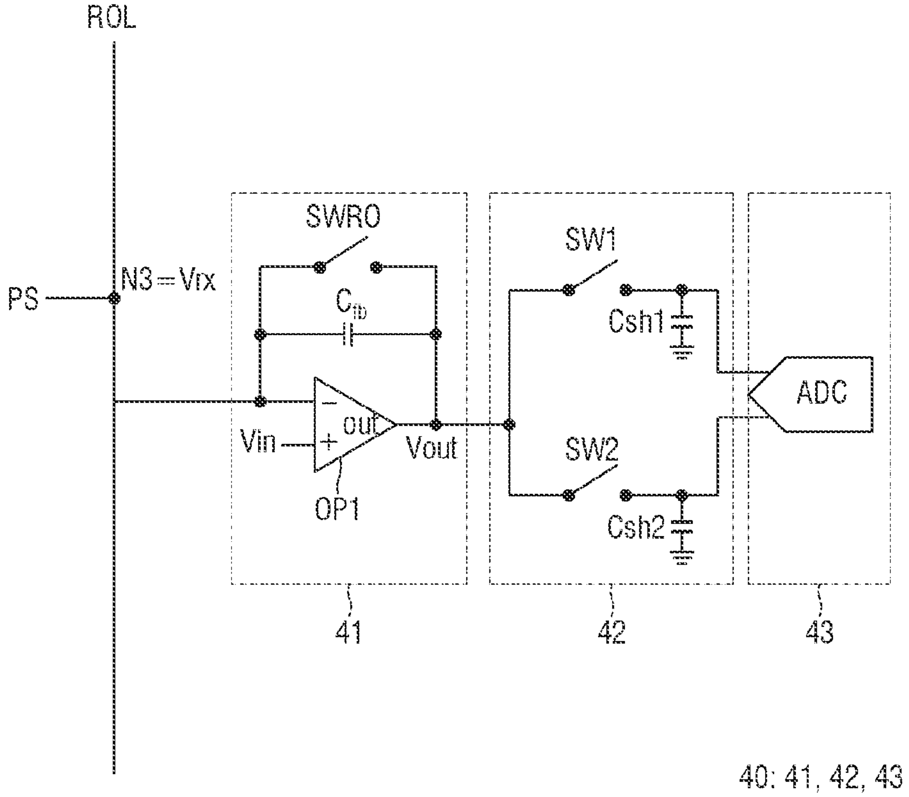
FIG. 14 is a circuit diagram of a read-out circuit according to an embodiment of the present disclosure.

FIG. 14 is a circuit diagram of a read-out circuit according to an example embodiment of the present disclosure.

Referring to FIG. 14, a read-out circuit 40 may be connected to an optical sensor PS through a read-out line ROL. The optical sensor PS is the same as its counterpart of FIG. 4 and is thus not illustrated in FIG. 14.

The read-out circuit 40 may include an amplifier 41, which is connected to the read-out line ROL, a sample/hold circuit 42, which stores an output voltage of the amplifier 41, and an analog-to-digital converter (ADC), which converts an analog signal corresponding to the output voltage of the amplifier 41 into digital data.

The amplifier 41 may include a first operational amplifier OP1, a feedback capacitor $C_{fb}$ and a feedback reset switch SWRO. The first operational amplifier OP1 may include a first input terminal "−", a second input terminal "+", and an output terminal "out". The input terminal "−" of the first operational amplifier OP1 may be connected to the read-out line ROL, an initial voltage Vin may be supplied to the second input terminal "+" of the first operational amplifier OP1, and the output terminal "out" of the first operational amplifier OP1 may be connected to the sample/hold circuit 42. An output voltage Vout of the first operational amplifier OP1 may be stored in a capacitor of the sample/hold circuit 42. The gain of the first operational amplifier OP1 may correspond to the capacitance of the feedback capacitor $C_{fb}$. The feedback capacitor $C_{fb}$ may store a sensing voltage Vrx, which is stored in a third node N3 of the optical sensor PS, through the read-out line ROL for one frame period.

The feedback capacitor $C_{fb}$ and the feedback reset switch SWRO may be connected in parallel between the first input terminal "−" and the output terminal "out" of the first operational amplifier OP1. The feedback reset switch SWRO may control the connection of both ends of the feedback capacitor $C_{fb}$. When the feedback reset switch SWRO is turned on to connect both ends of the feedback capacitor $C_{fb}$, the feedback capacitor $C_{fb}$ may be reset.

The sample/hold circuit 42 may include a first sampling capacitor Csh1, a second sampling capacitor Csh2, a first switch SW1, and a second switch SW2. The sample/hold circuit 42 may sample the output voltage Vout of the first operational amplifier OP1 and may hold the sampled output voltage in the first and second sampling capacitors Csh1 and Csh2.

The first sampling capacitor Csh1 may be connected to the output terminal "out" of the first operational amplifier OP1. When the feedback reset switch SWRO is turned off and the first switch SW1 is turned on, a noise signal voltage may be stored in the first sampling capacitor Csh1. The second sampling capacitor Csh2 may be connected to the output terminal "out" of the first operational amplifier OP1 through the second switch SW2. When the feedback reset switch SWRO is turned off and the second switch SW2 is turned on, the noise signal voltage and a sensing signal voltage may be stored in the second sampling capacitor Csh2.

The ADC 43 may differentially convert the voltages stored in the first and second sampling capacitors Csh1 and Csh2 into digital data. The ADC 43 may differentially convert the voltages stored in the first and second sampling capacitors Csh1 and Csh2 into fingerprint sensing data (e.g., a digital data) and output the digital data.

Figure 15:
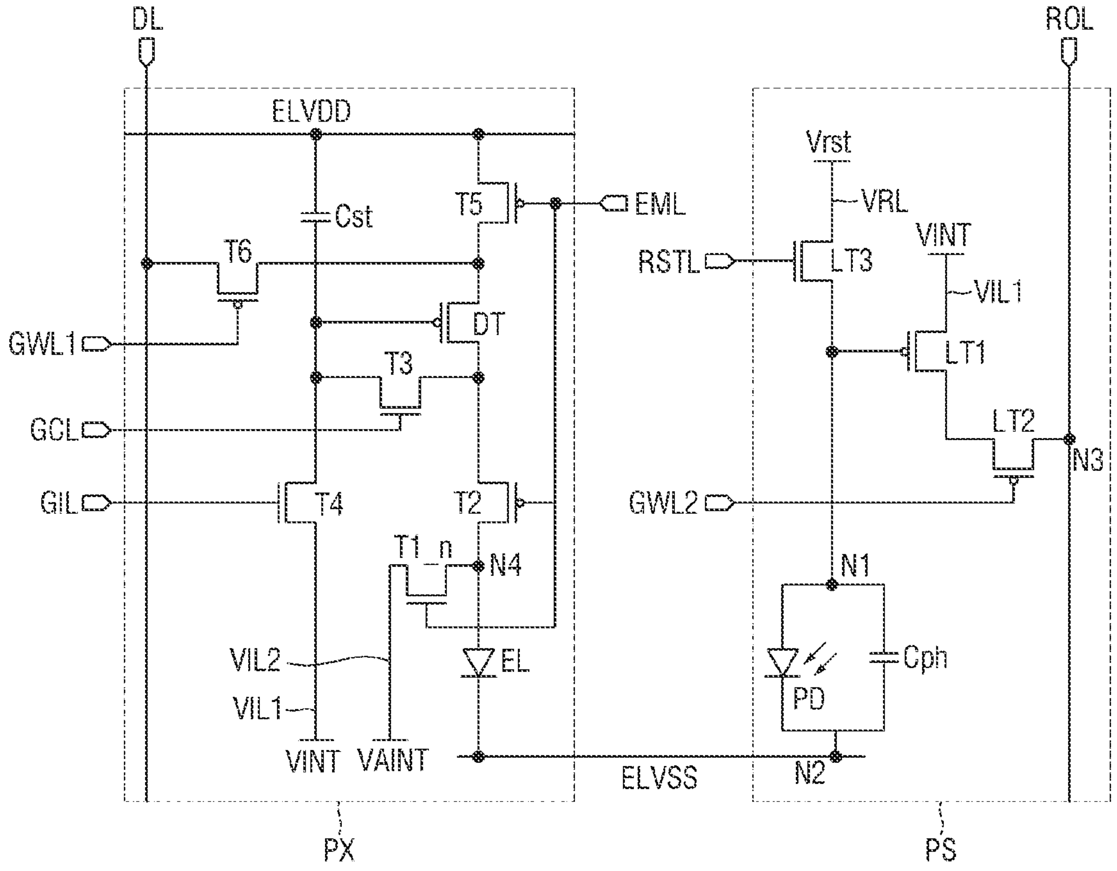
FIG. 15 is a circuit diagram of a pixel and an optical sensor of a display device according to an embodiment of the present disclosure.

Display devices according to other embodiments of the present disclosure will hereinafter be described with reference to FIG. 15. FIG. 15 is a circuit diagram of a pixel and an optical sensor of a display device according to an embodiment of the present disclosure.

Referring to FIG. 15, to reduce a dark current of a photoelectric conversion element PD, a reset voltage line VRL, which applies a reset voltage Vrst, may be connected to a first electrode of a third sensing transistor LT3. During a reset period RSP, in response to the third sensing transistor LT3 being turned on, the reset voltage line VRL may be connected to a sensing anode of the photoelectric conversion element PD and a first node N1. When the voltage of a second node N2 is uniform, the dark current of the photoelectric conversion element PD may decrease as the voltage of the first node N1 increases. Thus, in the embodiment of FIG. 15, unlike in the previous embodiment, a separate reset voltage line VRL, instead of a first-level voltage line VGLL, may be connected to the first electrode of the third sensing transistor LT3. Accordingly, since the reset voltage Vrst of the reset voltage line VRL can be driven independently, an operating point Vop of the photoelectric conversion element PD can be raised, and the dark current of the photoelectric conversion element PD can be reduced. Therefore, the power consumption of a display device can be improved.

Figure 16:
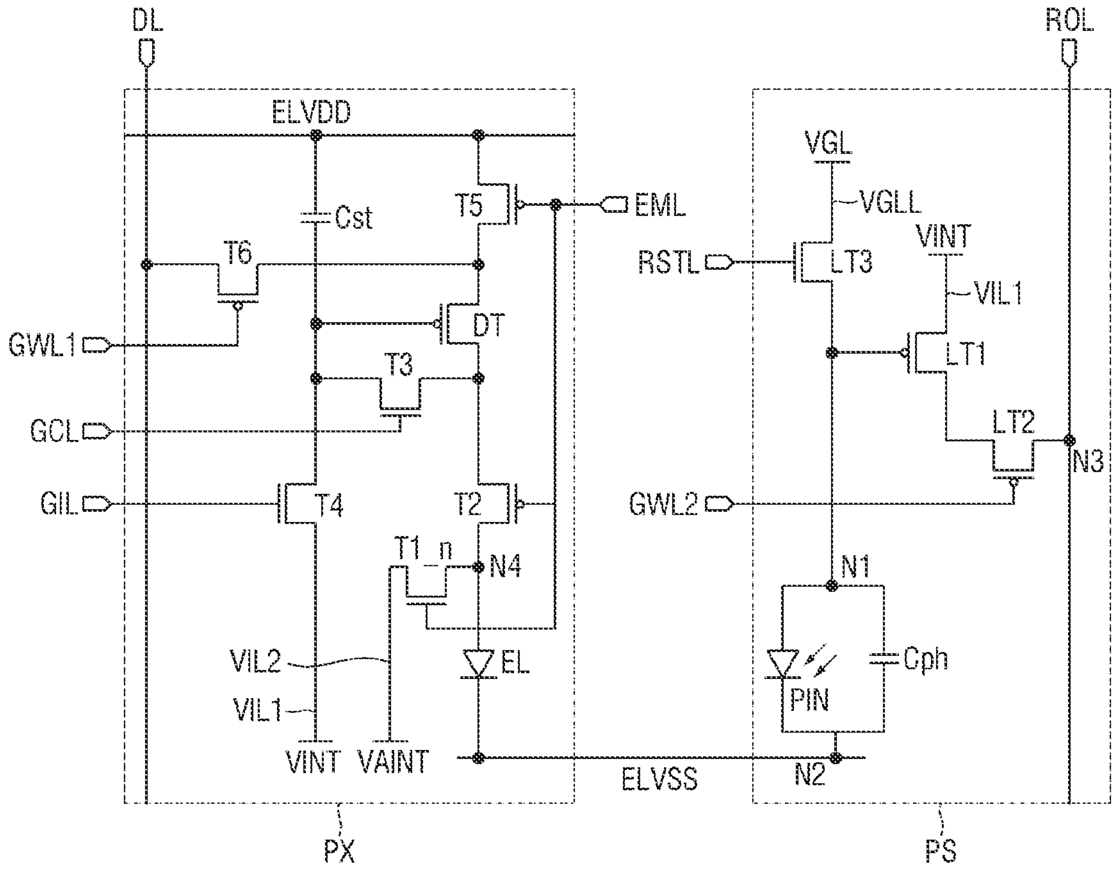
FIG. 16 is a circuit diagram of a pixel and an optical sensor of a display device according to an embodiment of the present disclosure.

FIG. 16 is a circuit diagram of a pixel and an optical sensor of a display device according to an embodiment of the present disclosure.

Referring to FIG. 16, the display device may include, in each pixel PX, a photodiode PIN, instead of a photoelectric conversion element PD, which includes an electron donating material and an electron accepting material, and the photodiode PIN may include an N-type semiconductor layer, an I-type semiconductor layer, and a P-type semiconductor layer. The P-type semiconductor layer may be connected to a sensing anode, the N-type semiconductor layer may be connected to a sensing cathode, and the I-type semiconductor layer may be disposed between the P- and N-type semiconductor layers. Specifically, the I-type semiconductor layer may be depleted by the P- and N-type semiconductor layers so that an electric field may be generated in the I-type semiconductor layer, and holes and electrons may be drifted by the electric field upon exposure to external light. As a result, the holes may be collected in the sensing anode through the P-type semiconductor layer, and the electrons may be collected in the sensing cathode through the N-type semiconductor layer.

In concluding the detailed description, those skilled in the art will appreciate that many variations and modifications can be made to the embodiments without substantially departing from the principles of the invention. Therefore, the disclosed embodiments of the invention are used in a generic and descriptive sense only and not for purposes of limitation.

What is claimed is:

1. A display device comprising:

a pixel including a display driver configured to apply a driving current to a light-emitting element; and an optical sensor including a sensing driver configured to apply a sensing current to a read-out line in accordance with a photocurrent from a photoelectric conversion element, wherein the pixel further comprises:

a driving transistor configured to control the driving current;

a first transistor configured to apply a first initialization voltage to an anode of the light-emitting element based on an emission control signal; and a second transistor configured to connect the anode of the light-emitting element to a first electrode of the driving transistor based on the emission control signal, and wherein a channel of the first transistor is a different material from channels of the driving transistor and the second transistor, wherein the optical sensor further comprises a reset transistor providing a first-level voltage directly to a sensing anode of the photoelectric conversion element for initializing the sensing anode of the photoelectric conversion element to the first-level voltage that is also used to set the emission control signal to turn off the first transistor, wherein the first transistor is turned on when the emission control signal is at a second-level voltage, wherein the initializing occurs when a gate electrode of the reset transistor receives the second-level voltage higher than the first-level voltage, and wherein a first electrode of the reset transistor is directly connected to a voltage line configured to provide the first-level voltage.

2. The display device of claim 1, wherein the channels of the driving transistor and the second transistor include polysilicon, and the channel of the first transistor includes an oxide semiconductor.

3. The display device of claim 2, wherein the driving transistor and the second transistor include P-type metal-oxide semiconductor field-effect transistors (MOSFETs), and the first transistor includes an N-type MOSFET.

4. The display device of claim 1, wherein the optical sensor further comprises: a first sensing transistor configured to control a sensing current flowing into the read-out line based on a voltage of the sensing anode of the photoelectric conversion element.

5. The display device of claim 4, further comprising:

first-level voltage lines transmitting the first-level voltage, wherein some of the first-level voltage lines are connected to a scan driver configured to provide scan signals, and others of the first-level voltage lines are connected to one of first and second electrodes of the reset transistor.

6. The display device of claim 4, wherein the light-emitting element includes an anode, a cathode, and a light-emitting layer disposed between the anode and the cathode, the photoelectric conversion element includes a sensing anode, a sensing cathode, and a photoelectric conversion layer disposed between the sensing anode and the sensing cathode, and the cathode and the sensing cathode are connected to a common voltage line configured to apply a common voltage.

7. The display device of claim 6, wherein the first-level voltage is lower than the common voltage.

8. A display device comprising:

a pixel including a display driver configured to apply a driving current to a light-emitting element; and an optical sensor including a sensing driver configured to apply a sensing current to a read-out line in accordance with a photocurrent from a photoelectric conversion element, wherein the pixel further includes a driving transistor configured to control the driving current, and a first transistor configured to apply a first initialization voltage to an anode of the light-emitting element based on an emission control signal, and the optical sensor further includes a first sensing transistor configured to control a sensing current flowing into the read-out line based on a voltage of a sensing anode of the photoelectric conversion element, and a reset transistor configured to provide a first-level voltage directly to a sensing anode of the photoelectric conversion element to initialize the sensing anode of the photoelectric conversion element to the first-level voltage that is also used to set the emission control signal to turn off the first transistor, wherein the pixel further includes a second transistor configured to connect the anode of the light-emitting element to a first electrode of the driving transistor based on the emission control signal, and the second transistor is turned on when the emission control signal having the first-level voltage is applied to the second transistor, and wherein a first electrode of the reset transistor is directly connected to a voltage line configured to provide the first-level voltage.

9. The display device of claim 8, wherein the light-emitting element is initialized when the emission control signal has a pulse rising from the first-level voltage to a second-level voltage higher than the first-level voltage, and emits light when the emission control signal has a pulse falling from the second-level voltage to the first-level voltage.

10. The display device of claim 8, further comprising:

a common voltage line configured to apply a common voltage to a sensing cathode of the photoelectric conversion element, wherein the first-level voltage is lower than the common voltage.

11. The display device of claim 10, wherein a cathode of the light-emitting element is electrically connected to the sensing cathode of the photoelectric conversion element.

12. The display device of claim 9, wherein the photoelectric conversion element is in a reverse-biased state during a period when the reset transistor is turned on.

13. The display device of claim 12, wherein an operating point of the photoelectric conversion element is lower than a reference voltage during the period when the reset transistor is turned on.

14. The display device of claim 8, wherein the optical sensor further includes a first node, which is disposed between the sensing anode of the photoelectric conversion element and the first sensing transistor, and a voltage of the first node increases during a period when the photoelectric conversion element is exposed to light.

15. The display device of claim 14, wherein the photoelectric conversion element generates a photocurrent flowing from a sensing cathode of the photoelectric conversion element to the sensing anode, during the period when the photoelectric conversion element is exposed to light.

16. The display device of claim 15, wherein the optical sensor further includes a second sensing transistor configured to connect the first sensing transistor and the read-out line based on a scan signal from a scan line.

17. The display device of claim 8, wherein a channel of the first transistor is a different material from channels of the driving transistor and the first sensing transistor.

18. An electronic device comprising:

a display device, comprising:

a pixel including a display driver configured to apply a driving current to a light-emitting element; and an optical sensor including a sensing driver configured to apply a sensing current to a read-out line in accordance with a photocurrent from a photoelectric conversion element, wherein the pixel further comprises:

a driving transistor configured to control the driving current;

a first transistor configured to apply a first initialization voltage to an anode of the light-emitting element based on an emission control signal; and a second transistor configured to connect the anode of the light-emitting element to a first electrode of the driving transistor based on the emission control signal, and wherein a channel of the first transistor is a different material from channels of the driving transistor and the second transistor, wherein the optical sensor further comprises a reset transistor providing a first-level voltage directly to a sensing anode of the photoelectric conversion element for initializing the sensing anode of the photoelectric conversion element to the first-level voltage that is also used to set the emission control signal to turn off the first transistor, wherein the first transistor is turned on when the emission control signal is at a second-level voltage, wherein the initializing occurs when a gate electrode of the reset transistor receives the second-level voltage higher than the first-level voltage, and wherein a first electrode of the reset transistor is directly connected to a voltage line configured to provide the first-level voltage.

* * * * *